US012675304B1

(12) United States Patent
Russell et al.

(10) Patent No.: US 12,675,304 B1
(45) Date of Patent: Jul. 7, 2026

(54) COMMUNICATIONS SYSTEM INVOLVING SUPERVISORY VIEW FEATURE

(71) Applicant: 8×8, Inc., Campbell, CA (US)

(72) Inventors: Patrick Russell, Columbus, OH (US); Vlad Ionut Derdeicea, Iaşi (RO); Hélio Fábio Venera Pires, Aveiro (PT)

(73) Assignee: 8x8, Inc., Campbell, CA (US)

( * ) Notice: Subject to any disclaimer, the term of this patent is extended or adjusted under 35 U.S.C. 154(b) by 259 days.

(21) Appl. No.: 18/211,424

(22) Filed: Jun. 19, 2023

Related U.S. Application Data

(60) Provisional application No. 63/357,781, filed on Jul. 1, 2022.

(51) Int. Cl.
    *G06F 9/451* (2018.01)
    *G06Q 30/015* (2023.01)
    *H04M 3/51* (2006.01)

(52) U.S. Cl.
    CPC ........... *G06F 9/452* (2018.02); *G06Q 30/015* (2023.01); *H04M 3/5191* (2013.01)

(58) Field of Classification Search
    CPC ...................... G06F 3/048–05; H04M 3/5191
    See application file for complete search history.

(56) References Cited

U.S. PATENT DOCUMENTS

| | | | |
|---|---|---|---|
| 5,473,732 A | 12/1995 | Chang | |
| 6,424,935 B1 | 7/2002 | Taylor | |
| 7,236,932 B1 | 6/2007 | Grajski | |
| 8,407,576 B1 * | 3/2013 | Yin | G06F 3/0481 |
| | | | 715/837 |
| 8,788,535 B2 | 7/2014 | Bonev et al. | |
| 10,133,461 B1 * | 11/2018 | Roberts | H04M 3/5191 |
| 10,142,329 B1 | 11/2018 | Liu | |

(Continued)

FOREIGN PATENT DOCUMENTS

| | | |
|---|---|---|
| WO | 2022/240433 A1 | 11/2022 |
| WO | 2022/256028 A1 | 12/2022 |

OTHER PUBLICATIONS

TheSandWraith: How to merge iOS messages conversation feed? Apple Inc., https://discussions.apple.com/thread/6566339, 4 pages (Sep. 27, 2014).

(Continued)

*Primary Examiner* — Daniel Rodriguez
(74) *Attorney, Agent, or Firm* — Vista IP Law Group, LLP

(57) ABSTRACT

As may be implemented in accordance with one or more embodiments, aspects of the disclosure are directed to methods and/or apparatuses involving the provision of data on a user experience-type interface. Service circuitry can be utilized to provide services, including a plurality of applications that generate data sets in accordance with operational characteristics thereof, for a plurality of endpoint devices. User experience (UX) circuitry may be utilized to provide a UX interface for at least one of the plurality of endpoint devices. A UX interface including a plurality of panes corresponding to different regions of a display is configured. At the endpoint device, respective data is displayed in each pane using data sets generated by different ones of the plurality of applications, each pane being associated with one of the data sets that is different than ones of the data sets associated with another one of the plurality of panes.

20 Claims, 8 Drawing Sheets

(56) References Cited

U.S. PATENT DOCUMENTS

| | | | |
|---|---|---|---|
| 10,318,617 B2 | 6/2019 | Gelfand et al. | |
| 10,616,345 B1 | 4/2020 | Quimette et al. | |
| 10,735,592 B1 | 8/2020 | Liu et al. | |
| 10,939,179 B2 | 3/2021 | Park et al. | |
| 10,949,619 B1 | 3/2021 | Arsanjani et al. | |
| 10,994,800 B2 | 5/2021 | Noguchi et al. | |
| 11,025,488 B1 | 6/2021 | Arsanjani et al. | |
| 11,044,338 B1 | 6/2021 | Arsanjani et al. | |
| 11,070,640 B1 | 7/2021 | Arsanjani et al. | |
| 11,196,866 B1 | 12/2021 | Samat et al. | |
| 11,328,359 B1* | 5/2022 | Dahm | G06F 3/0482 |
| 11,425,252 B1 | 8/2022 | Martin et al. | |
| 11,445,063 B1 | 9/2022 | Driemeyer et al. | |
| 11,539,541 B1 | 12/2022 | Driemeyer et al. | |
| 11,551,005 B1 | 1/2023 | Arsanjani et al. | |
| 11,575,755 B1 | 2/2023 | Arsanjani et al. | |
| 11,575,791 B1 | 2/2023 | Arsanjani et al. | |
| 11,622,043 B1 | 4/2023 | Samat et al. | |
| 12,210,938 B1* | 1/2025 | Jacob | G06F 16/2228 |
| 2003/0055974 A1 | 3/2003 | Brophy et al. | |
| 2004/0143559 A1 | 7/2004 | Ayala | |
| 2005/0043987 A1* | 2/2005 | Kumar | G06F 3/04847 |
| | | | 705/7.42 |
| 2006/0126801 A1* | 6/2006 | Laperi | G06Q 10/06 |
| | | | 379/32.01 |
| 2008/0086564 A1 | 4/2008 | Putman et al. | |
| 2008/0097850 A1* | 4/2008 | Kristal | G06Q 30/02 |
| | | | 705/14.27 |
| 2009/0112875 A1 | 4/2009 | Maes | |
| 2009/0217194 A1* | 8/2009 | Martin | G16H 50/20 |
| | | | 715/783 |
| 2009/0271486 A1* | 10/2009 | Ligh | H04M 1/7243 |
| | | | 345/173 |
| 2009/0276215 A1 | 11/2009 | Hager | |
| 2009/0292590 A1* | 11/2009 | Zaidi | G06Q 10/06398 |
| | | | 707/999.009 |
| 2010/0064374 A1* | 3/2010 | Martin | G16H 40/63 |
| | | | 715/785 |
| 2010/0246800 A1 | 9/2010 | Geppert et al. | |
| 2011/0046960 A1 | 2/2011 | Spier et al. | |
| 2012/0017165 A1* | 1/2012 | Gardner | H04L 41/22 |
| | | | 715/771 |
| 2013/0024760 A1* | 1/2013 | Vogel | G06Q 10/06393 |
| | | | 715/733 |
| 2013/0055132 A1* | 2/2013 | Foslien | G06F 16/248 |
| | | | 715/771 |
| 2014/0100848 A1 | 4/2014 | Shaffer et al. | |
| 2014/0173509 A1* | 6/2014 | Wu | G06F 16/248 |
| | | | 715/800 |
| 2014/0211933 A1* | 7/2014 | Vymenets | H04M 3/5175 |
| | | | 379/265.06 |
| 2015/0153918 A1* | 6/2015 | Chen | G06Q 10/0639 |
| | | | 715/771 |
| 2015/0212663 A1* | 7/2015 | Papale | G06F 16/245 |
| | | | 715/762 |
| 2015/0350443 A1 | 12/2015 | Kumar et al. | |
| 2016/0095056 A1 | 3/2016 | Lebon-schneider et al. | |
| 2016/0227035 A1 | 8/2016 | Kumar et al. | |
| 2016/0349960 A1 | 12/2016 | Kumar et al. | |
| 2017/0006161 A9 | 1/2017 | Riahi et al. | |
| 2017/0123397 A1* | 5/2017 | Billi | G05B 19/048 |
| 2017/0147308 A1* | 5/2017 | Wang | G06F 8/54 |
| 2018/0004634 A1* | 1/2018 | Brown | G06F 11/3676 |
| 2018/0018364 A1* | 1/2018 | Gupta | G06F 3/04817 |
| 2018/0234550 A1 | 8/2018 | Lifson et al. | |
| 2018/0314396 A1* | 11/2018 | Swaminathan | G06Q 10/10 |
| 2018/0315000 A1 | 11/2018 | Kulkarni et al. | |
| 2019/0215249 A1 | 7/2019 | Renard et al. | |
| 2019/0235712 A1* | 8/2019 | Kim | G06F 3/0482 |
| 2020/0342850 A1 | 10/2020 | Vishnoi et al. | |
| 2021/0350425 A1* | 11/2021 | Alfia | G06F 16/3334 |
| 2022/0138219 A1* | 5/2022 | Beckham | G06Q 50/02 |
| | | | 715/738 |
| 2022/0308720 A1 | 9/2022 | Korzhenevich et al. | |
| 2022/0317823 A1* | 10/2022 | Nugraha | G06F 3/04845 |
| 2022/0398306 A1* | 12/2022 | Misra | G06F 21/36 |
| 2023/0384904 A1* | 11/2023 | Gabin | H04L 41/22 |
| 2023/0394409 A1* | 12/2023 | Hernandez | G06Q 10/0633 |

OTHER PUBLICATIONS

Alex Heath. Merge Clears Up Confusion by Combining iMessages From Multiple Device IDs Right In iOS [JailbreakCon]. https// www.cultofmac.com/category/news/, 9 sheets (Sep. 29, 2012).
8×8, "8×8 Frontdesk", https://www.8x8.com/products/business-phone/frontdesk?locale=us&utm_medium=paid-search&utm_source=google&utm_campaign=elite&utm_adgroup=Google_US_Search_Brand_Frontdesk|AAA_8×8_Frontdesk&utm_term=8×8% 20front% 20desk&type=Google_US_Search_Brand_Frontdesk &gclid=Cj0KCQiA4b2MBhD2ARIsAIrcB-RkZXOwVjVgTkcRcA_XSIAMzBFL5JJvV7M7xi9_fCrXSVOIZamU5OUaAii8EALw_wcB, downloaded Apr. 25, 2023.
8×8, "8×8 Work", https://www.8x8.com/products, downloaded Apr. 25, 2023.
8×8, "8×8 Work", https://www.8x8.com/products, downloaded Aug. 2023.
8×8 Admin Console, "Set up call park extension." 8×8, Inc. (2022), 1 sheet. https://docs.8x8.com/8x8WebHelp/admin-console/Content/Set_up_Call_Park_Extension.htm.
USPTO. Final Office Action dated Aug. 16, 2024, received for U.S. Appl. No. 17/839,157 of the instant Applicant/Assignee.
USPTO. Office Action dated Jun. 25, 2024, received for Design U.S. Appl. No. 29/842,406 of the instant Applicant/Assignee.

* cited by examiner

COMMUNICATIONS SYSTEM INVOLVING SUPERVISORY VIEW FEATURE

CROSS-REFERENCE TO RELATED APPLICATIONS

Aspects of various embodiments are directed to apparatuses (e.g., systems, devices, etc.) and to methods such as those described in the claims, description or figures herein and in U.S. Provisional Patent Application Ser. No. 63/357, 781 filed on Jul. 1, 2022, to which priority is claimed and which is fully incorporated herein by reference. For information regarding details of other embodiments, experiments and applications that can be combined in varying degrees with the teachings herein, reference may be made to the teachings and underlying references provided in Appendices 1-2 that form part of the above-mentioned Provisional Patent Application.

BACKGROUND

In data-communications systems/platforms providing data communications as a service to client entities and their leadership personnel (e.g., supervisors, managers, directors and other group and/or business leaders), such personnel may have multiple software applications to manage and monitor operational performance. These personnel have to toggle from application to application or in some cases can have the software providers merge whole applications into another in order to simplify the number of applications to toggle between. The effort to merge applications requires technical resources from either technology provider resulting in additional costs as well as inefficiencies from a processing standpoint (computing devices). Further, disparate systems/types of circuitry may operate with disparate operational and communications protocols, which may prevent interoperability and/or make such interoperability computationally burdensome. Further, user-experience (UX) platforms and related functionality have been quite limited with respect to effecting changes.

SUMMARY

Various example embodiments are directed to issues such as those addressed above and/or others which may become apparent from the following disclosure.

In exemplary contexts, aspects of the present disclosure are directed to user-interface display aspects wherein the display may be used for user management and/or workflow management, for example, by leadership personnel (e.g., as above in the context of supervisor, manager, director, etc.) to manage one or more users (or groups of users), tasks (or group of tasks), or a combination thereof. According to such a leader-directed approach in the form of a system, a method or as a feature in a system or method, there are composed user-experiences (aka UX such as one having multiple panes in one UX display view of a user interface) to enable real-time (or near real-time) review and alteration of one or more components of any application configured in connection with a data-communications system/platform (e.g., on behalf of a client entity authorized to receive the data communications services). In a more specific example, such aspects or features may be provided through use a user interface ("UI" or alternatively, graphic UI or GUI) in a data-communications system and platform that provides data communications services a single virtual workspace with most if not every available component from every available application accessible to the leadership personnel through the UI.

In certain more specific examples, aspects of the present disclosure are directed to systems, circuits, screens, etc., and/or methods of use, each involving a data-communications system operating with a data-communications management circuit and with a user interface for providing operations related to data communications (e.g., involving media calls, chat streams, emails, messages, etc.) to and/or from targets (e.g., individuals, by endpoint devices, companies, membership group, or other designated subsets of prospective communication/call participants).

In specific examples, the present disclosure is directed to an apparatus (e.g., a system-type apparatus or a device-type apparatus such as a computer device that provides or includes a display or a field of view (FoV)) which may be in connection with a set of one or more data servers (server set) providing specified data communications services to selected individuals and/or groups of individuals as part of client entities. In such contexts involving a data-communications system, a user interface and a data-communications management circuit, as may be implemented for example by a computing processor, provides a universal workspace for enabling leadership personnel to readily add, remove and/or customize most if not any and every component of any application provided via the user interface circuitry. The user interface may be implemented by a computing processor circuit that includes a memory circuit with one or more databases including identifiers of the callers and/or targeted call participants, and that operates the user interface to display certain information concurrently in respective sections of a FoV. This information may be provided via an adapted user interface that concurrently displays certain information in concurrently- or sequentially-displayed sections, thereby creating a composed user experience for use, for example, by leadership personnel (e.g., of a subscriber client entity subscribing to receive certain of the system's data-communications services) who have rights to add/remove and otherwise customize certain components. As a non-limiting example, an exemplary user interface concurrently displays a plurality of sections as indicated in the Provisional Patent Application, including Appendix 1 and/or Appendix 2, as referenced above.

Another embodiment is directed to a system comprising service circuitry and UX circuitry. The service circuitry may include a network-enabled communications circuit, and provides services, including a plurality of applications that respectively generate data sets in accordance with operational characteristics of each application, through client-specific data-communications with a plurality of endpoint devices. The UX circuitry is configured to provide a UX interface for at least one of the plurality of endpoint devices by configuring a UX interface including a plurality of panes corresponding to different regions of a display, and by displaying respective data in each pane using data sets generated by different ones of the plurality of applications, each respective pane being associated with one of the data sets that is different than ones of the data sets associated with another one of the plurality of panes.

Another embodiment is directed to a computer-implemented method for aiding in supervision of a call center using a plurality of components that generate respective data sets indicative of call center status, as follows. Services are provided to include operating a plurality of applications via a server circuit to respectively generate data sets in accordance with operational characteristics of each application, and providing client-specific data-communications with a plurality of endpoint devices corresponding to the generated data sets. A UX display is provided, which includes a plurality of panes corresponding to different regions of a display at the one of the plurality of endpoint devices. At the at least one of the plurality of endpoint devices, respective data is displayed in each pane using data sets generated by different ones of the plurality of applications, each respective pane being associated with one of the data sets that is different than ones of the data sets associated with another one of the plurality of panes.

Building on one or more of the above aspects, further non-limiting examples of a user interface may include additional sections that can provide further context to users of the system and/or user of the user interface including additional communication and/or status-tracking modalities (e.g., chat, messaging), and contextual data insights/suggestions for enhancing data provided in the user interface (e.g., that may be automatically generated and including real-time (including near real-time) updates based on user activity within an exemplary application/service and/or specified parameters (e.g., time window, context, client ID, project ID, sales-prospect ID, product ID).

In another example, contextual information provided in association with exemplary sections of a user interface is utilized to generate call routing determinations and/or accumulation of status data corresponding to or linked to a certain parameter ID.

Functionality associated with an exemplary user interface is further enhanced by the incorporation and application of artificial intelligence that is specifically trained to execute automatic actions on behalf of a user and/or parameter ID based on contextually relevant information. In some technical instances, an artificial intelligence model may be user-specific and trained based on contextual data relevant to a specific user and further instance artificial intelligence modeling may be generated for more than one user (e.g., one or more groups of users) and/or for one or more parameter IDs. In connection with the above and other specific example embodiments, one or more other specific aspects involving the computing processor circuit may be used alone or in combination with one another as a separate feature or to build on the above-disclosed aspects of the above example embodiments. Some non-limiting examples of aspects may include the computing processor circuit being configured to: use an artificial-intelligence algorithm to train a model, wherein in response to being trained, the model is to be used for automatically flagging of components for possible alteration, filtering of certain of the contacts in the directory database, and for automatically auto-populating and/or updating directory listings in the directory database during one or more of the calls; use an artificial-intelligence algorithm to train a model, wherein in response to being trained, the model is to be used for providing real-time or near real-time contextual analytics pertaining to specific aspects displayable in the FoV, the specific aspects including one or more of: one or more menus configured on behalf of and/or specific to a client entity; and/or provide prompts to alert certain types of situations needing to be addressed or being benefited by being addressed.

In yet further examples, aspects of the present disclosure are respectively directed to systems, circuits, graphic user interfaces having the above-characterized types of FoVs, to methods of using such systems, circuits and UIs having characterized type of FoVs as in Appendix 1 and/or Appendix 2, and to aesthetic designs in which the above-characterized UI-type FoV are arranged for viewing.

In yet other examples, aspects of the present disclosure (e.g., one or more of the aspects shown in a displayed FoV) can be a stand-alone app/service or can be integrated into another app/service such as 8×8 Work® App (available from the instant assignee, 8×8, Inc.). The related FoV designs may be implemented to work across both desktop and/or mobile apps. For example, if a user is working on their mobile app using one of these designs, that would sync across both (as shown in some of the screenshots attached to the Account Executive and Executive Assistant documentation).

Additionally, such aspects of the present disclosure may work in connection with any of various types of systems providing unified communications (e.g., unified communications as a service, 'UCaaS'), contact center communications (e.g., contact center as a service, "CCaaS'), communications platform as a service ("CPaaS"), for example, enabling usage of application programming interfaces (APIs) and the like to customize communication stacks and integrate chosen communication channels into applications, services, websites, etc., and/or a combination thereof (e.g., providing a platform which may be referred to as XCaaS (Experience Communications as a Service)).

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description and in connection with the accompanying drawings, in which.

Figure 1:
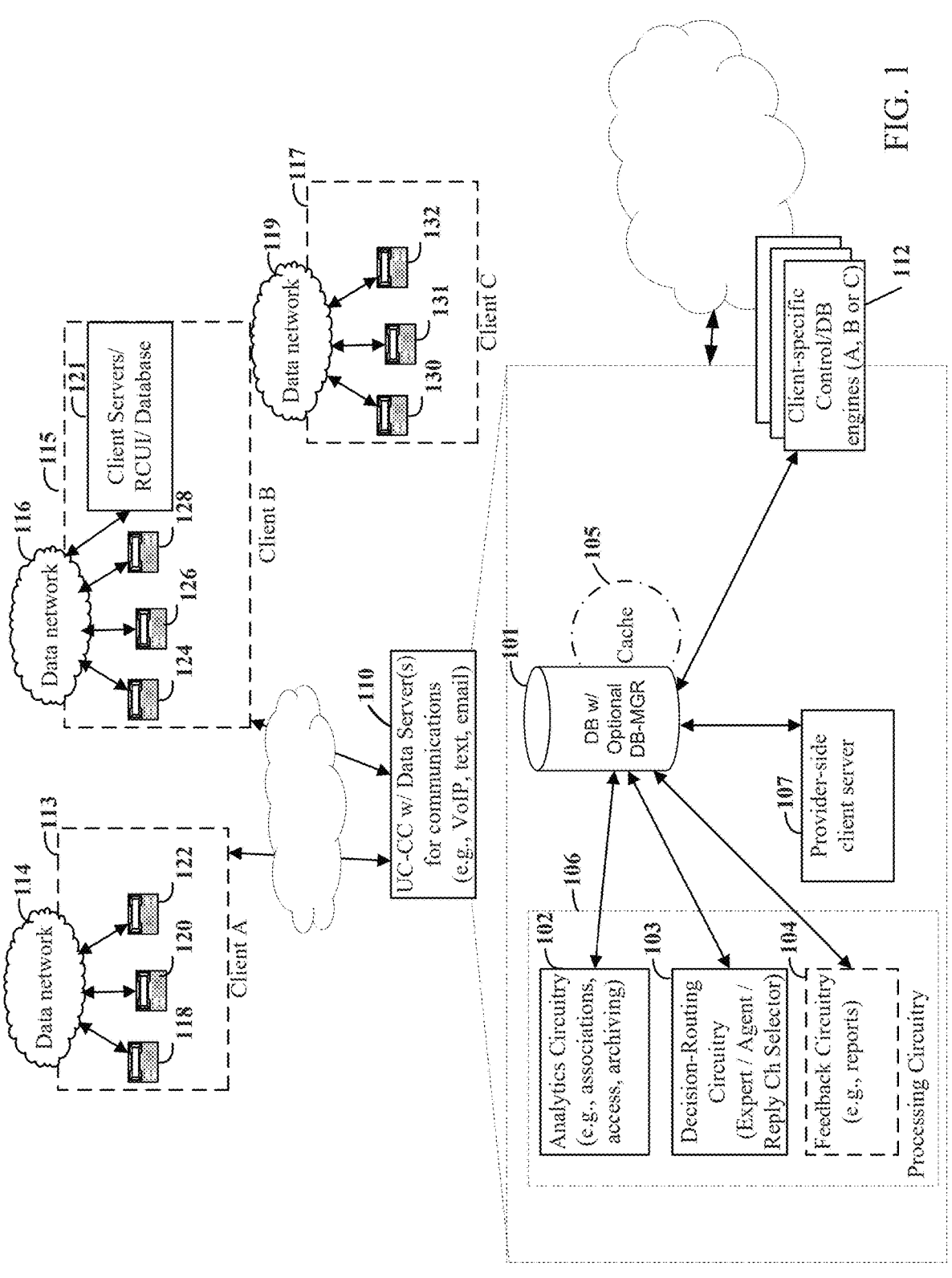
FIG. 1 illustrates a data-communications system in block diagram form, in accordance with various embodiments.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as may be used throughout this application is by way of illustration, and not limitation.

DETAILED DESCRIPTION

Aspects of the present disclosure are believed to be applicable to a variety of different types of apparatuses, systems and methods involving one or more user interfaces operable as part of or concurrently with a data communications system that provides data-communications services. As one specific example, such data-communications services may include call center services with managing and processing of incoming data communications involving a group of active and/or prospective call participants and unified communications wherein such incoming calls are readily and intelligently routed as may be provided via data communications services such as one or more of call-routing services. Other such data-communications services and/or types of media provided via such services may include one or more of the following: VoIP (voice over Internet) communications, virtual office, chat, messaging, call recording and transcription, video calls; audio calls; multi-media calls (e.g., involving audio and video); emails; and messaging (including SMS). For instance, 8×8, Inc. (the assignee of the present disclosure) provides such data communications services to individuals and/or participating entities representing groups of individuals. In certain implementations, aspects of the present disclosure have been shown to be beneficial when used in the context of a data communications system providing such services to a plurality of entities, wherein for each entity, one or more users (e.g., business leaders) has access to a user interface with one or more of the FoV provided via an exemplary user interface according to the present disclosure (and as may be illustrated in Appendix 1 and/or Appendix 2). While certain specific examples discussed below may reference a particular type of system, data-communications services or media types, certain aspects of the present disclosure are not necessarily so limited.

Accordingly, in the following description various specific details are set forth to describe specific examples presented herein. It should be apparent to one skilled in the art, however, that one or more other examples and/or variations of these examples may be practiced without all the specific details given below. In other instances, well-known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

In a specific type of example embodiment, an apparatus includes one or more data communications servers ("server set"), a computing processor circuit having a directory contacts database and a user interface, and a data-communications management circuit. The server set is to communicate or route calls initially routed by a server of a data-communications system and designated to provide data-communications services for targeted call participants. The computing processor circuit may include a memory circuit with the directory contacts database (e.g., having identifiers of the targeted call participants) and may include a user interface to display various content in a FoV of a display. In further non-limiting examples according to the present disclosure, such a user interface may include additional sections for providing further data and/or context to users including additional communication modalities (e.g., chat, messaging), and contextual data insights and/or suggestions for communication routing and/or handling (e.g., that may be automatically generated and rendered for a user) pertaining to any functionality of the present disclosure described herein including real-time (or near real-time) updates based on user activity within an exemplary application/service, among other examples.

As a non-limiting example, such aspects of the present disclosure may work in connection with any of various types of systems providing features and functionality for UCaaS), CCaaS, CPaaS and/or a combination thereof (e.g., XCaaS), as a communications software platform for which the present disclosure may be adapted to manage, may comprise but are not limited to: contact center capabilities including workforce management (e.g., supervisory management of users such as agents, enterprise resource planning); analytics; third-party integrations software integrations including customer relationship management (CRM) tools; device management (e.g., phones including both physical phone devices and softphones, PBX, phone numbers, porting, etc.); issue management including support and help desk ticketing management; billing management; administrative management control including administrative console apps/services to enablement management of users (RBAC; profiles, desk phones; phone systems; works groups (ring groups, call queues, group paging, overhead paging, barge-monitor-whisper, music on hold, etc.); interactive voice response (IVR); call routing and distribution; omnichannel communications and integration for content management across different modalities; call recording functionality; data storage (e.g., including control over hot and cold storage); phone dialers; conversation management including messaging via chat (individual and group), SMS/MMS, including with employees, agents, conversational AI bots, etc.; machine learning and/or artificial intelligence integrations including bots such as chatbots; reporting/report generation; video conferencing and meeting management; CPaaS connectivity; website management, management of service availability; and an ML/AI platform for data integration and augmentation, among other examples.

Various aspects of the present disclosure are directed towards a unified UX that provides coherent data access from multiple sources (e.g., including third-party data sources integrated within a software platform), to drive proactive monitoring and actions for user and/or workflow management. Through graphical user interface elements, an adapted user interface of the present disclosure enables action to be taken quickly by a user (and efficiently via a computing device adapted to execute a corresponding application/service) to best manage supervision of workflows (e.g., tasks and/or users). As a non-limiting example, the present disclosure provides functionality for supervisory users of a contact center to manage agents in real-time and dynamically change their assignments if needed while said agents perform contact center or help desk tasks.

Accordingly, various embodiments are directed toward apparatuses and/or systems that operate to interact with and/or operate disparate application sources for generating disparate sets of data, which may then be combined and presented via the unified UX. Such interaction may, for example, involve real-time generation of specific data sets based on need, facilitating efficiency with respect to computational overhead and speed, relative to operating full applications. Certain embodiments utilize secure gateway circuitry, which may be operated to ensure that data sets from respective applications and/or associated with disparate endpoint devices (or groups thereof and related entities) may be accessed and maintained such that access between certain applications may be restricted. For instance, where two disparate third-party applications are accessed to obtain data sets that are used for a unified UX, access between the third-party applications and/or to the respective data sets may be restricted.

In a particular embodiment, a system is operable for aiding in controlling a call center using a plurality of applications that respectively generate data sets corresponding to characteristics of the call center. The system includes service circuitry to provide services, including the plurality of applications, through client-specific data-communications with a plurality of endpoint devices. As utilized herein, service circuitry may include one or more network-enabled communications circuits, and may provide services including software as a service to users (e.g., applications that may operate remotely and discretely, to present an interface and/or data sets that may be used in an interface to a user endpoint). User experience (UX) circuitry provides a UX interface for at least one of the plurality of endpoint devices. Specifically, a workspace is configured to include a graphical user interface (GUI) provided for display at the at least one of the plurality of endpoint devices, the GUI including a plurality of panes that define respective areas of the workspace; users may completely customize their workspace (or workspaces), which may include any of: configuring the layout of their workspace with the ability to modify that configuration at any time to create new workspaces and/or workspace views; selecting the components and/or data sources that are integrated in their workspace/workspace view including dynamically changing components and/or data sources that are included in a workspace representation; selecting features/functionalities for reporting/analytics including an ability to toggle on/off features for reporting/analytics to further create customized reports in real-time (or near real-time); and configuring control over data insights/suggestions, among other examples. The UX circuitry associates respective ones of the data sets generated by different ones of the plurality of applications with specific ones of the panes. Each respective pane is associated with one of the data sets that is different than ones of the data sets associated with one or more of the other ones of the plurality of panes. For instance, users can set up the UX layout to display information obtained from different applications, and the UX may interface with other applications within a common organization/entity or third-party applications, to obtain information to display in each pane. In response to receiving data corresponding to associated ones of the data sets, the UX circuitry displays the data in the pane associated with the data set. As alluded above, an exemplary UX is adapted to be an extensible toolbox for users thereof. An exemplary UI is adapted to provide users with the option to change UX menus, components that are included therein (including interfacing their own components or other third-party components), which can lead to fully customized representations for supervisory management, applicable analytics, and reporting. As an example, by a user incorporating their own components and/or third-party components, exemplary workspaces are further customized and done so in a way that data analytics and reporting may become more comprehensive and customized. An adapted UI is further configured to provide users with the ability to set thresholds for supervisor management, which may include time-specific thresholds (e.g., management of a workflow over a given period of time such as hour, day, week, month, year(s), etc.); action-specific thresholds (e.g., completion/incompletion of an action, task, etc.), or a combination thereof.

Moreover, the UI is further adapted to enable functionality, features, and/or components to be searchable and extensible. Functionality and components are searchable and extensible in that users can selected from pre-programmed workspace templates, components, etc. or incorporate their own or other third-party components. An adapted UI is configured to enable users to modify workspace representations (and components thereof) through drag and drop actions or the like. Users can search through a repository of pre-configured workspace templates, and/or components. In some examples, data repositories of components are organized by category based on the component type and/or software platform that the present disclosure is being incorporated in. The present disclosure may be incorporated into a software-as-a-service (SaaS) communications offering in which components may be searchable based on the type of communications product/service offering (e.g., UCaaS, CCaaS). In alternative examples where an exemplary UI workspace is adapted for a specific purpose (e.g., CCaaS offering), components related to specific feature/functionality control of a CCaaS offering may be organized and searchable according to the feature/functionality control that a supervisory user may desire.

The system may utilize cloud operations, local operations, or a combination thereof. For instance, the endpoint devices may be configured to remotely communicate with the service circuitry and the UX circuitry over a network, and configured to display the UX interface by displaying a UX interface provided over the network by the UX circuitry. Application circuitry may be implemented at one of the plurality of endpoint devices to display the data in the pane associated with the data set. In certain instances, such application circuitry includes at least a portion of the UX circuitry that operates on the one of the plurality of endpoint devices to display the data in the pane associated with the data set.

The UX circuitry may interface with applications in a variety of manners. For instance, the UX circuitry may be configured with the service circuitry to communicate instructions that control one or more of the applications to execute operations for generating the respective ones of the data sets. The UX circuitry may be configured with the service circuitry to communicate instructions that control one or more of the applications to execute operations for generating the respective ones of the data sets from each of the plurality of applications. The generated data sets may then be displayed respectively in one of the panes associated with the data set.

In certain embodiments, the service circuitry is configured to store one of the data sets generated by the plurality of applications in a data storage circuit. The UX circuitry may display the data in the pane associated with the data set by accessing the data storage circuit, retrieving the stored data set corresponding to the associated data set, and displaying the retrieved stored data set.

The UX circuitry may display the data in the pane associated with the data set by accessing a combination of the data sets and displaying, in the pane, data corresponding to different ones of the data sets. For instance, where a user at an endpoint elects to display graphical data that relies upon data sets generated by different applications, respective data sets may be obtained from each application and combined to produce a graphical display specific for that user.

In some instances, the UX circuitry is configured to generate a new data set based on data sets generated by different ones of the applications, and display the new data set in the pane. For instance, where a user requests real-time data, the UX circuitry may operate to control an application to generate a new data set, which can then be used for one of the panes. In this context, computational overhead, power, and resources may be saved by facilitating operational control of applications on an as-needed basis.

As noted above, UX interfaces may be tailored, and in some embodiments, are tailored specifically in each of multiple supervisor endpoints within an entity. For instance, the UX circuitry and the service circuitry may be configured to communicate with one another for providing the UX interface to a plurality of endpoint devices corresponding to a common entity. The UX interface for at least two of the endpoint devices may have a different configuration in which data sets displayed in panes at each endpoint device draw from data sets corresponding to a common set of the applications.

In a particular contact center type implementation (e.g., as characterized elsewhere herein). The UX circuitry provides contact center functions to one or more of the endpoint devices, by associating and displaying the respective ones of the data sets that characterize operational characteristics of remote contact center terminals. Data communications routing options are then provided for routing external data communications to respective ones of the remote contact center terminals, in response to user input selections provided in response to the data sets characterizing the remote contact center terminals. For instance, where the data sets characterize performance, technology capability, or other aspect of remote contact center terminals (e.g., and users at those terminals), this characterization may be utilized to select routing options for routing communications to those terminals.

UX interfaces and/or GUI displays provided at a particular endpoint may be toggled in accordance with user preferences. For instance, the UX circuitry may be configured to present at least two disparate GUI displays for one of the endpoints, each GUI display having a different arrangement of panes and displaying data corresponding to different ones of the data sets. A user may provide an input selection, and the UX circuitry may then toggle between displaying the respective GUI displays in response thereto.

In some instances, the UX is operable to facilitate control of respective ones of the applications by users at the endpoint devices. In an embodiment, the UX circuitry is configured to provide a control option in at least one of the panes, in which the control option may correspond to operational instructions to be sent for execution by at least one of the plurality of applications. In response to receiving a user input corresponding to the control option, an operational instruction may be generated and sent to one or more of the applications, to cause the application(s) to generate a new data set. This new data set may then be used in providing and displaying data corresponding to the new data set in one of the panes.

Another embodiment is directed to a system including service circuitry and UX circuitry. The service circuitry provides services, including applications that respectively generate data sets in accordance with operational characteristics of each application, through communications with a plurality of endpoint devices. The UX circuitry provides a UX interface for at least one of the endpoint devices by configuring a UX interface including a plurality of panes corresponding to different regions of a display (at the endpoint device), and by displaying respective data in each pane using data sets generated by different ones of the plurality of applications. Each respective pane is associated with one of the data sets that is different than ones of the data sets associated with another one of the plurality of panes. The UX circuitry and service circuitry may operate to communicate instructions that control at least one of the plurality of applications to execute operations for generating the respective ones of the data sets.

In certain implementations, the UX circuitry operates to provide the UX interface to the endpoint devices by sending data that, when received at the endpoint device, causes the endpoint device to display the UX interface to include user-selectable display options. The UX circuitry also operates to send user data to the UX circuitry indicative of ones of the user-selectable display options selected by a user, and to display the respective data in each pane (e.g., cause such a display) by using data sets generated by different ones of the plurality of applications that correspond to the user-selectable display options indicated in the user data.

In some implementations, the UX circuitry is configured with the service circuitry to display the data in the pane associated with the data set by accessing stored ones of the data sets previously generated by the plurality of applications and stored in a data storage circuit, and displaying data corresponding to the stored ones of the data sets. In other implementations, the UX circuitry accesses data sets as those generated in ongoing operation of the applications. In still other implementations, the UX circuitry causes different ones of the plurality of applications to execute operations to respectively generate different new ones of the data sets based on user input received at one of the endpoints specifying characteristics of the data sets to be displayed thereon, and displays data corresponding to the generated new ones of the data sets at the one of the endpoint devices. A combination of such approaches may be implemented for one or more panes as noted herein.

In another embodiment, the UX circuitry is configured to provide a plurality of predefined GUI displays for one of the endpoints. Each predefined GUI display may have a different arrangement of panes and displaying data corresponding to different ones of the data sets, and to toggle between displaying the GUI displays on the one of the endpoints in response to a user input received via the UX interface provided at the one of the endpoints.

A variety of methods may be carried out in accordance with the above and other embodiments, According to a particular embodiment, a computer-implemented method operates for aiding in supervision of a call center using a plurality of components that generate respective data sets indicative of call center status, as follows. A plurality of applications are operated via a server circuit to respectively generate data sets in accordance with operational characteristics of each application. Client-specific data-communications are provided with a plurality of endpoint devices corresponding to the generated data sets. A UX display is generated having panes corresponding to different regions of a display at one of the endpoint devices, where respective data is displayed in each pane using data sets generated by different ones of the plurality of applications. Each respective pane is associated with one of the data sets that is different than ones of the data sets associated with another one of the plurality of panes. The data sets may be generated by communicating instructions, based on inputs received at one of the plurality of endpoint devices, that control one or more of the applications to execute operations for generating the respective ones of the data sets for the one of the plurality of endpoint devices.

The UX interface may be provided to the endpoint devices by sending data that, when received at the endpoint device, causes the endpoint device to display the UX interface to include user-selectable display options. User data can be sent to the UX circuitry indicative of ones of the user-selectable display options selected by a user, and respective data in each pane can be displayed using data sets generated by different ones of the plurality of applications that correspond to the user-selectable display options indicated in the user data.

In some implementations, predefined GUI displays may displayed at one of the plurality of endpoints, each pre-defined GUI display having a different arrangement of panes and displaying data corresponding to different ones of the data sets. Different ones the displays may be toggled for display based on user input received via the UX interface provided at the one of the endpoints.

In some implementations, different ones of the applications are controlled to execute operations to respectively generate different new ones of the data sets based on user input specifying characteristics of the data sets to be displayed thereat. Data corresponding to the generated new data sets is displayed at the one of the endpoint devices.

Exemplary technical advantages provided by processing described in the present disclosure comprise but are not limited to: provision of a performance centric unified UX that provides completely customizable and extensible work-spaces for supervisory management of workflows (e.g., tasks and/or users); generation and automated application of real-time (or near real-time) analytics and metrics for super-visory management of workflows; improving processing for integrating third-party components into a software platform and thereby enabling richer and customizable reporting and analytics for a software platform; improves reliability for software platform including integration of components (e.g., widgets) built directly into software platform (stand-alone or integrated apps/services) in a manner that removes the need for data orchestration with respect to source connections; generation and application of trained AI processing that is adapted to automatically aid processing of contextual deter-minations related to supervisory management of workflows; improved processing efficiency (e.g., reduction in process-ing cycles, saving resources/bandwidth) for computing devices when executing supervisory management of work-flows; reduction in latency through efficient processing operations that improve management of workflows, for example in a supervisory capacity; provision of an improved GUI adapted to provide GUI features for supervisory man-agement of workflows; ability to adapt and apply trained AI processing to generate different versions of trained AI mod-els (e.g., lightweight modeling versus robust modeling) for application in different contextual scenarios (e.g., processing with different host applications/services) for supervisory management of workflows; and improved usability of host applications/services for users via integration of processing described herein, among other technical advantages.

While the below-discussed figures illustrate certain exem-plary types of systems in which aspect of the present disclosure may form part, these illustrated types of systems are not necessarily limiting. For example, according to the present disclosure certain aspects are directed to an exem-plary arrangement of one or more data communications servers ("server set") arranged, for instance, in a cloud-based arrangement native to the Internet. In this example context, the server set is communicatively integrated with a computing processor circuit having a directory contacts database and, for facilitating call-center-like management and/or control by a user, and the server set is also commu-nicatively integrated with a user interface and a data-com-munications management circuit. In one specific embodi-ment, the server set may include a client-entity specific server or computing processor engine, and incoming calls to the data communications system may be communicated and routed to the client-entity specific server or computing processor engine where a user interface is operated by a user (e.g., receptionist, leadership personnel or other user of the UI) for processing of the calls on behalf of targeted call participants. For example, the targeted call participants may be part of the client entity for which the client-entity specific server or computing processor engine is configured to receive the services of the data-communications system (e.g., as a data-communications services subscription). The user interface may be part of call-center service which is one of many available services provided by the data-communi-cations system, with such data-communications services including audio, chat, email and multimedia communica-tions.

As discussed herein, in various applications and contexts the user interface may be operated by any of different types of users (e.g., receptionist, leadership personnel or other user of the UI). While the disclosure may refer to one such user type (e.g., receptionist), it will be appreciated that any specifically-indicated user type may be replaced by another specifically-indicated user type (such as by substituting "leadership personnel" for "receptionist").

The computing processor circuit may include a memory circuit with the directory contacts database (e.g., having identifiers of the targeted call participants) and may include a user interface to display the user interface's most practical and/or convenient (e.g., most relevant and/or commonly-used) fields in respective sections of a FoV (field of view). The FoV may be a display screen of a computer circuit (e.g., a display screen of a desktop computer, of a personal user device such as an IPAD, or a mobile phone). In other implementations, the FoV may be a projected view (e.g., via 3D eyewear or a hologram, a light-transmitted projection onto a wall or other surface). Regardless of the viewing medium deployed, in specific examples and as discussed above, these sections in the FoV may correspond to that which is depicted and disclosed in connection with the screen shots (or illustrations) of Appendix 1 and Appendix 2.

In connection with the above types of exemplary embodi-ments, more specific features or aspects may be used, for example, as enhancements. According one such specific aspect, an exemplary UI provides a composed visual expe-rience that is required to meet the demands of users, and also provides efficient processing of the data communication via a communication circuit, concurrently executing therewith. In this manner, feature functionality is accessible through an adapted user interface which, from a processing standpoint, creates a composed and comprehensive user experience. Through graphical user interface elements, an adapted user interface of the present disclosure enables action to be taken quickly by a user (and efficiently via a computing device adapted to execute a corresponding application/service) to best manage communication handling. Additionally, exem-plary feature functionality comprises user interface features that integrate across the different described sections of the user interface and enabling actions to be taken across different display sections, thereby truly creating a composed user experience.

Such features or aspects involving the user interface may be used alone in certain embodiments or in combination with one another as a separate feature to build on the above-disclosed aspects of the above example embodiments.

FIG. 1 illustrates one such example data-communications system in block diagram form and consistent with certain of the above-related examples and aspects of the present disclosure. As depicted, the data-communications system includes a data-communications server (or set of one or more servers) 110 configured to provide data communications services, including data communications such as VOIP calls and other types of interactions (e.g., text, chat, email, etc.), for a plurality of endpoint devices 118, 120, 122, 124, 126, 128, 130, 131 and 132 connected in one or more data networks 114, 116, 119. Using such a system, exemplary aspects of the present disclosure may be apparent from the above discussion regarding use of a unified communications platform for facilitating different types of communications services including circuitry (e.g., within at least one server 110) to process data communications to be processed and/or routed over different channels, and/or to adjust components (linked or associated with the data communications services to be provided to a specific client entity) as indicated in one or more sections in a field of view provided by such a user interface. Consistent with the above discussion of exemplary embodiments, a more specific exemplary FoV may include sections such as shown in Appendix 1 and/or Appendix 2.

In a more specific example, one feature may configurable by or on behalf of a user of the user interface (e.g., employee, administrator and/or supervisor) and/or may configurable by a computer processor running an artificial-intelligence (AI) algorithm to flag and identify which of different components may be monitored and/or altered based on certain parameters accessible at a display via the user interface (e.g., as may be limited for a certain context). The AI algorithm may use, as the certain context, a given span of time (e.g., generally or limited to certain parameter IDs for flagging the components, and/or to certain times of the day, certain periods of the week, or other calendar-specific aspects).

Alternatively, such an AI algorithm may discern (e.g., via call monitoring circuitry) a specific context regarding the incoming call before and/or while the call is being processed at the user interface. The specific context may be the given span of time as characterized above, and as an alternative to the given span of time (or in addition thereto), the specific context may be supplementary information relevant to the users of the user interface (e.g., as a category with the discerned context which category is messaged or alerted to the user). In this manner, example embodiments may use the AI algorithm to discern categories of individuals and/or components based on one or more factors associated with the incoming call/individuals, the computer processor running the AI algorithm may use a look-up table to select one or more features to be shown in one or two sections of the FoV. This general-information icon may become a high-lighted entry in the directory section and/or may be in a separate section of the FoV and used as a suggested connection to be optionally selected by the user of the user interface.

In other exemplary embodiments, the computer processor running the AI algorithm may be given access to status conditions of the data communications system, components used by a specific client entity in connection with the system. More specifically, examples in these regards may provide the AI-enabled computer processor with information: to discern that the incoming call is in a certain call category indicated by way of the FoV-displayed directory (e.g., the call is related to sales or related to technical services or involve a customer requiring special attention); to discern from monitoring the call (e.g., via recognized trigger words and/or indication of sentiment in the call) that supervisor involvement is required; to discern from the targeted call participant that there is overload of too many calls being processed by personnel associated with the targeted call participant (e.g., a related receptionist, a department of individuals associated with the targeted call participant); and to automatically (re) configure, based on the discerned context or a status condition, one or more of the FoV sections with a particular icon or indication, so that the receptionist can more readily see and select the particular icon or indication. In certain further examples, such aspects permit the receptionist to more readily recognize that the particular icon or indication has such calls being processed in an automated manner, and the computer processor running the AI algorithm may discern a special context and based on a single UI selection or engagement by the receptionist, may cause such incoming call(s) to be automatically handled so as to avoid burdening certain personnel and/or overwhelming another FoV section.

As another particular example consistent with the above discussion of such an AI algorithm being trained and/or used to recognize certain contexts of the incoming call, the computer processor running the AI algorithm may monitor the caller identification data of the incoming call relative to designated aspects as indicated in the identified parameters (or components) as noted in Appendix 1 and/or Appendix 2. Given that the AI algorithm may automatically recognize a certain condition or a threshold (e.g., relating to a certain parameter) being reached, UI may automatically alter the FoV so as to change one of the Appendix-A characterized FoV sections (e.g., as new FoV section acting as a replacement or a supplemental section to be displayed).

Referring to FIG. 1 in connection with more specific system-level example embodiments which may be used with the present disclosure, a data-communications server 110 may include an arrangement of coordinated servers such as one or more VOIP communications servers that provide VOIP communications and one or more other types of communications servers that provide such other forms of data communications service(s). Although FIG. 1 illustrates two data networks 114, 116 communicatively coupled to the data-communications server 110, examples are not so limited and the data-communications server 110 can be communicatively coupled to three or more data networks, including as examples but not limited to broadband networks such as the Internet, cellular-telephony and/or satellite communications networks, etc. Such networks and communicatively-coupled endpoint devices are configured to communicate with one another (directly and/or indirectly) using data-communications circuits which are typically wireless transceivers with user interfaces (graphic user interfaces, audible, etc.). For purposes of facilitating discussion, various specific embodiments are herein directed to methods and apparatuses that include the data-communications server 110 and processing circuitry 106 in one or more of the above-noted variety of forms. Although the processing circuitry 106 is illustrated as a component of the data-communications server 110, embodiments are not so limited and the processing circuitry can form part of or be separate from the data-communications server 110.

In such contexts, exemplary aspects may also involve data-communications apparatuses, such as servers and user-operable endpoint devices capable of communicating over a broadband network (e.g., Internet, other private and/or public network) with a plurality of remotely-located data-communications circuits respectively associated with a plurality of remotely-situated client entities. The servers may be arranged as a unified-communications platform ("UC-CC platform") which includes one or more UIs for providing call-center actions by receptionists as described above. The UC-CC platform, in this type of system, is integrated with a memory circuit including a database of information sets, and processes incoming data-communication interactions including different types of digitally-represented communications. Among such communications may be an incoming communication or call (e.g., "interaction"). Each of the information sets includes experience data corresponding to past incoming data-communication interactions processed by the platform, and with aggregated and organized data based on data collected in previous incoming interactions. The platform accesses the database and may: use past interactions and other data sources; and the receptionist-operable UI is to facilitate an automated self-service experience for users by resolving inquiries discerned through the incoming interactions; and/or effecting call-decision routing of incoming interactions to call-center agents or specialists.

The memory circuit may include a database, such as 101 in FIG. 1 or a separate memory circuit, having a plurality of information sets. As examples, each of the information sets may include user/client-entity contact information and/or experience data corresponding to past incoming data-communication interactions processed by the platform, and with the information sets being populated via an aggregation of organized data based on data collected in previous incoming interactions. The platform regularly accesses the database to assess the incoming interactions and may use past incoming interactions along with information collected via other data sources (e.g., internal to the system such as AI/ML modeled data and/or third-party information). By analyzing the incoming interactions and accessing possible associations relative to the information sets in the memory circuit 101, the platform is able to help the user of the UI (e.g., receptionist or other user) by optimizing the FOV section(s) as described above.

Further, the AI model may be trained to automatically filter the directory based on contextual cues discerned from the computer processing circuit in real time or otherwise. As an example, one such related feature is to auto-populate and update directory listings while there are active calls. For instance, a receptionist or user of the UI may consistently route calls to a specific person/group, where the directory listing can be automatically updated in real-time (view-wise) to put that person at the top of list so that personnel do not have to spend time going through directory. This reduces latency and improves efficiency. Another example is where the computer processing circuit is monitoring calls for keywords (or emotions as may be discerned from audio or digital voice data) that can be used to automatically update directory with certain historical comments (e.g., VIP, special expertise, technical person, sales-type person, difficult person to deal with, etc.). When implementing this feature, the computer processing circuit may control, in view of privacy/regulatory issues, what information may be linked with the person in the directory (e.g., by permitting the receptionist to view and select a menu of selectable options based on the discerned contextual cues).

Such analytics (e.g., as provided by such an AI algorithm) may be incorporated in real-time to help provide suggestions to users of the UI on how to handle certain possibly difficult situations/issues. Specific examples include: given the recognized context/issues involving this particular or type of call, there is a likelihood that the call should be transferred to a certain person or department (with the likelihood being X % of the time); user-specific analytics with past alerts that this particular caller has a special status requiring special handling (e.g., transfer to a supervisor, using calming words so as not to escalate the caller, etc.); and this particular caller and/or user was on hold for 10 minutes previously (or had filed a complaint previously) so expedite processing of this call.

As other example aspects according to the present disclosure, results of trained AI processing can be used to provide the UI with specific data and/or context for automatic data insight notifications to aid with automatic notifications to the user interface FoV for providing immediate data insights. For instance, ML/AI can be applied to correlate data and generate customized data insights that are specific to a user's customized workspace, creation of new workspaces (including suggested workspace templates for specific configuration), insights related to usage of a software platform (e.g., a communications software platform) including features/functionalities, components, processing efficiency of integrated components, contemplation of third-party integrations, management of data (including customer data and/or supervisory management of users), analytics and reporting, or a combination of any of the foregoing. Data insights, suggestions, etc. can also be generated and provided to users through an exemplary UI (integration or standalone application/service), to user devices including desktop and/or mobile devices, or other modalities (e.g., email, messaging, social media, etc.) In one example, analyzed data can be utilized to assist with building an individual customer profile, which can be generated to proactively profile user usage and potential needs, for example, associated with a user of a communications software platform. In the supervisory context, data insights and/or suggestions can be generated pertaining to coaching analytics and/or suggested content, training for review based on user performance or any type of data correlation discernable from a specific software platform. For example, a supervisory user may receive an automated data insight that suggests the supervisory user review a topic with a user (e.g., speed of call handling, customer holds/transfers) and/or content for the user to review to improve efficiency/performance. This type of contextual data can be derived from application of ML/AI modeling that is adapted to analyze specifics of operation of a software platform (e.g., communications software platform), for example, where a user's performance can be quantified and evaluated against itself and/or other users (e.g., other agents) in a similar sector or across an organization. Other non-limiting examples of data insights that may be generated include but are not limited to: automatic updates of UI menus such as directory/registry; automatic prioritization of held calls (e.g., based on priority, time on hold, etc.); suggestions for managing resource allocation (e.g., user assignments in real-time); and automatic suggestions for call routing (persons/departments) including automatic UX messages accompanying the same.

Furthermore, the present disclosure is further adapted to enable trained AI processing to further contemplate other types of signal data that may be collected through various host applications/services (e.g., pertaining to a software platform). For instance, application of trained AI processing (e.g., one or more trained machine learning models may be adapted to evaluate not only data and data sources integrating with an exemplary supervisory workspace for workflow management but other types of contextual data including past and/or current user actions, user preferences, application/service log data, etc., that are each associated with one or more user accounts. This additional signal data analysis may help yield determinations as to how (and/or when) to generate updated analytics (in real-time or near real-time) and/or reporting, as well as when and how often to present data insights and/or suggestions. Non-limiting examples of signal data that may be collected and analyzed includes but is not limited to: device-specific signal data collected from operation of one or more user computing devices; user-specific signal data collected from specific tenants/user-accounts with respect to access to any of: devices, login to a distributed software platform, applications/services, etc.; application-specific data collected from usage of applications/services and associated endpoints (including third-party endpoints integrated within a software platform); or a combination thereof. Analysis of such types of signal data in an aggregate manner may be useful in helping generate contextually relevant determinations, data insights, etc. Analysis of exemplary signal data may comprise identifying correlations and relationships between the different types of signal data specific to user usage of software data platform (e.g., communications software platform), where telemetric analysis may be applied to generate determinations with respect to a contextual state of user activity with respect to different host application/services and associated endpoints. Analyzing of signal data, including user-specific signal data, may occur in compliance with user privacy regulations and policies.

In some examples, one or more components are configured to manage application of one or more AI models to enhance processing described in the present disclosure. Trained AI processing is applicable to aid any type of determinative or predictive processing including specific processing operations described with respect to determinations, classification ranking/scoring and relevance ranking/scoring. An exemplary component for implementation trained AI processing may manage AI modeling including the creation, training, application, and updating of AI modeling. Trained AI processing may be adapted to execute specific determinations described herein including those for analyzing specific data and data sources of a software data platform (e.g., a communications software platform) and/or generating insights for data augmentation. For instance, an AI model may be specifically trained and adapted for execution of processing operations pertaining to analyzing features and functionality of an XCaaS offering including those non-limiting examples previously described. Non-limiting examples of AI implementation including but are not limited to: analyzing data (and metadata) associated with one or more software platforms including third-party integrations; generating contextual determinations for improving user experience, performance, efficiency including contextual determinations for improving supervisory management of a workflow (e.g., tasks and/or users); suggesting utilization of workspace templates, components, and/or integrations including third-party integrations to enhance a UX; prioritization of tasks, actions, etc. to improve workflow and processing; and generation of insights including suggestions for review of users and/or provision of training/assistance, among other examples. Exemplary AI processing may be applicable to aid any type of determinative or predictive processing by any components of the present disclosure, via any of: supervised learning; unsupervised learning; semi-supervised learning; or reinforcement learning, among other examples. In one example, trained AI processing comprises a hybrid AI model (e.g., hybrid machine learning model) that is adapted and trained to execute a plurality of processing operations described in the present disclosure. In alternative examples, trained AI processing comprises a collective application of a plurality of trained AI models (e.g., 3 trained AI models) that are separately trained and managed to execute processing described herein. In alternative examples, the present disclosure extends to integrating third-party AI modeling and further adapting and customizing said AI modeling to work with specific data and data sources of an exemplary software platform. For example, a third-party AI model may be adapted to work with a communications software platform including data, data sources, and integrations (e.g., APIs, web hooks, etc.) related to XCaaS features and functionality. In examples where a plurality of independently trained and managed AI models is implemented, downstream processing efficiency is improved by an ordered application of trained AI models where processing results from earlier applied AI models can be propagated to subsequently applied AI models. For example, a trained AI model may evaluate a queue of agents and derive data correlations to improve processing and efficiency including suggestions for reallocation of resources, which may then be utilized to suggest a re-allocation of resources to improve efficiency and quality of services provided.

Non-limiting examples of supervised learning that may be applied comprise but are not limited to: nearest neighbor processing; naive bayes classification processing; decision trees; linear regression; support vector machines (SVM) neural networks (e.g., convolutional neural network (CNN) or recurrent neural network (RNN)); and transformers, among other examples. Non-limiting of unsupervised learning that may be applied comprise but are not limited to: application of clustering processing including k-means for clustering problems, hierarchical clustering, mixture modeling, etc.; application of association rule learning; application of latent variable modeling; anomaly detection; and neural network processing, among other examples. Non-limiting of semi-supervised learning that may be applied comprise but are not limited to: assumption determination processing; generative modeling; low-density separation processing and graph-based method processing, among other examples. Non-limiting of reinforcement learning that may be applied comprise but are not limited to: value-based processing; policy-based processing; and model-based processing, among other examples. Furthermore, a component for implementation of trained AI processing may be configured to apply a ranker to generate relevance scoring to assist with any processing determinations with respect to any relevance analysis described herein. Scoring for relevance (or importance) ranking may be based on individual relevance scoring metrics described herein or an aggregation of said scoring metrics. In some alternative examples where multiple relevance scoring metrics are utilized, a weighting may be applied that prioritizes one relevance scoring metric over another depending on the signal data collected and the specific determination being generated. Results of a relevance analysis may be finalized according to developer specifications. This may comprise a threshold analysis of results, where a threshold relevance score may be comparatively evaluated with one or more relevance scoring metrics generated from application of trained AI processing.

The user endpoint devices are circuit-based instruments that may be used by personnel (or users) and include data communications-enabled circuitry, such as VoIP-enabled endpoint devices (e.g., IP phones, smart phones, tablets, and/or desktop computers with appropriate VoIP software applications) and/or non-data communication/VoIP enabled endpoint devices (e.g., plain old telephone service (POTS) telephones and cellular-capable devices). Each endpoint device may be respectively associated with an account of a respective client. The endpoint devices can be associated with a particular client account by registering the endpoint device with a particular client account serviced by the data-communications server 110. Registered devices for each client account can be listed in a respective account settings file (not shown) stored by the data-communications server 110. In this example, endpoint devices 118, 120, and 122 are associated with an account 113 for a first client A and endpoint devices 124, 126, 128 are associated with an account 115 for a second client B (and similarly endpoint devices 130, 131 and 132 for client C). In such a manner, a plurality of endpoint devices can each be serviced by the data-communications server 110 in accordance with aspects of the present disclosure. One or more of the clients can have client servers and/or databases 121 which are used to implement a variety of different services.

Accordingly, the endpoint devices are data-communications circuits which may be remotely located relative to the data-communications server 110 and may be respectively associated with remotely-situated client entities. In certain but not all embodiments, the data-communications system may include the remotely-located data-communications circuits such as the client station. In some instances one or more of the endpoint devices corresponds to and/or includes a computer or a smartphone (e.g, mobile phone or tablet) that functions as a softphone by running application software; and/or a computer or a smartphone to operate natively within a web browser (e.g., using webRTC) and in turn the web browser is to run on such a computer or a smartphone.

The system may include one or more processing circuits configured to implement client-specific engines or servers (e.g., computer processing circuitry and/or servers configured specifically for one or more specific client entities), which are configured to adjust the data-communications provided for the associate client account(s) according to a respective set of control directives. The client-specific control engine can be part of the server set at 110 as in FIG. 1, and/or such client-specific engines or servers may be respectively co-located at or near respective facilities of the associated client entities (e.g., Client A at 113, Client B at 115 and Client C at 117). In each such example, the above-characterized UI is configured as part of the client-specific control engine. The client-specific engines or servers may be used to adjust routing of an incoming interaction (e.g., a VoIP-type data or text communication) to or from an endpoint device associated with a client account. As further examples, incoming calls to the client may be processed by the receptionist(s) and the UI efficiently and intelligently routing the calls to appropriate agents of the client, and this processing may be optimized for the UI so as to have a manageable and organized perceptive view of the various FOV sections.

In certain more specific system-related embodiments with the client-specific engines or servers implemented in various locations as discussed above, the respective UIs can be implemented through a central system server (such as at 110 of FIG. 1). Additionally or alternatively, one or more client-specific engines or servers can be implemented by one or more processing circuits maintained by the client including, for example, database circuit 101 which may include a database manager with configurable memory circuitry including security-controlled access and filtering functions (e.g., call-blocking and/or automatic call routing based on client/user profiles and/or AI-provided data or feedback, or blocking access to certain application-generated data sets). Similarly, the control directives can be stored locally within the client-specific control engines, or stored remotely (e.g., in a centralized database, in a database maintained by the client entity, or a combination thereof). In certain specific examples, the database manager (and/or database 101) refers to or includes a relational database management system (RDMS) which stores data securely and returns the data in response to requests from other applications, as implemented by a database management server, and which can temporarily store data in cache memory 105 for fast access by the server at 110.

In other specific examples and consistent with the above examples in which the computer processing circuit runs an AI algorithm, the present disclosure is directed to a call center UI-based automated or semi-automated self-service to aid call-center receptionists in providing callers a positive experience. In these examples, the data-communications server 110 of FIG. 1 may coordinate with the processing circuitry 106 and various related circuits (e.g., servers, software-directed aspects of CPU(s), logic circuitries, etc.) so that analytics circuitry 102 can analyze an incoming call (or interaction) relative to content in the database 101 and/or relative to AI algorithm models used by analytics circuitry 102. The AI algorithm models may be integrated with or otherwise have access to decision-routing circuitry 103 for deciding whether and/or how an incoming interaction should be routed, and in certain more specific examples or applications also having feedback circuitry 104. In specific embodiments, the data-communications server 110 may use the analytics circuitry 102 to analyze an incoming interaction by capturing and analyzing digital voice data from spoken conversations in connection with incoming interactions such as between agents of a client entity and customers. This AI-discerned information may be used to suggest to the UI user or receptionist how to best process the call. The spoken conversations being transcribed from audio to digital voice data by the data-communications server 110, the computer processing circuit may use the UI to provide and access relevant aspects of the transcribed audio for use by the receptionist who may be attempting to process the incoming call.

The transcription of the spoken audio words to digital voice data can occur via a variety of methods. By discerning the contact information and/or other content (e.g., context of call and/or the transcription), the decision-routing circuitry 103 of FIG. 1 can access the information sets to check for associations and, if certain associations relevant to the current (e.g., live) call are detected, the call may be routed as indicated by an associated one of the information sets, by user/client-entity profile settings stored with or linked to the associated one of the information sets, and/or based on a metric indicating sufficient confidence that the routing the call to a specific designation is appropriate (e.g., to an expert such as a specialist having been training or otherwise having special knowledge regarding topic discerned from the call, or to an agent/manager who is assigned to the topic or incoming interaction), and each such decision may be discerned by accessing and analyzing the information sets. For more general and specific teachings on transcribing audio to test, reference may be made to U.S. Publication No. 2009/

0276215, filed on Apr. 17, 2007, entitled "Methods and Systems for Correcting Transcribed Audio Files;" U.S. Pat. No. 7,236,932, filed Sep. 12, 2000, entitled "Method of and Apparatus for Improving Productivity of Human Reviewers of Automatically Transcribed Documents by Media Conversion Systems;" and U.S. Pat. No. 6,424,935, filed Jul. 31, 2000, entitled "Two-way Speech Recognition and Dialect System," each of which are fully incorporated by reference in their entirety for their general teachings and for their teachings in this specific regard. For more general and specific teachings on use of analytics (e.g., AI) circuitry and/or aspects regarding such a UC-CC platform, transcribing audio to test, reference may be made to PCT Application No. PCT/US2021/048238, file Aug. 30, 2021, entitled "Communications Apparatus Using Channel Communications Management". Each of the above-identified patent documents is incorporated by reference in its entirety generally and for the specific aspects noted hereinabove.

In such examples, computing processor circuitry may also be configured to use an AI algorithm to train an AI model (sometimes referred as AI and/or machine learning), wherein in response to being trained, the model is to be used for automatically performing certain functions or activities on behalf of a client entity. For example, the client entities have may respective client-specific engines or servers 112 of FIG. 1 co-located with or otherwise serving respective Clients A, B and C, with each being integrated with AI-enabled computer processor circuitry. Alternatively and as may be convenient for smaller client entities without a co-located client-specific server, the system may have the computing processor circuitry (and UI and/or management circuitry) that is cloud based or integrated in a provider-side client server 107 which is to serve (but treat separately) multiple individuals clients as though they did have their own respective client-specific servers. Hence, the functionality makes it appear that each client has a dedicated server, despite multiple clients accessing the server 107. The AI-enabled computer processor circuitry may be integrated along with the UI and data-communications management circuitry which may be separate from or distributed in each such client-specific server and the server 110. In these and other example configurations, the AI model training may involve automatically auto-populating and/or updating directory listings in the directory database during one or more of the calls, and filtering of certain of the contacts in the directory database in response to the receptionist selecting certain sections of the user interface (e.g., the UI). In response to being trained, the AI model is to be used by the computer processing circuitry for providing real-time or near real-time contextual analytics pertaining to specific aspects displayable in the FoV, and with the contextual analytics being used to prompt the receptionists via a configurable entry or section of the UI's FoV. Further, such prompting may lead the receptionist to select an aspect as displayed on the FoV to automate a certain feature (e.g., certain playback audio specifically related to a discerned one of the contexts) and/or to access additional information that is relevant to the incoming call for possible additional selection by the receptionist. In this context, for example, the computer processing circuitry may prompt the receptionist to select one or more menus (e.g., as a subcategory the directory) for directing certain incoming calls (e.g., to an expert or specialist), or for directing certain incoming calls of certain customers to specific contacts as indicated by links in the directory database, and to a supervisor in the event of a possible problems concerning an emotion (or trigger word or intonation) relating to a perceived or actual ability of an agent to process the incoming call(s) as may be needed for a positive caller experience. As properly trained from previous interactions and/or client-specific customization, the AI algorithm may also be trained so that the model is to be used for providing automatic notifications to/from the receptionist via the UI, wherein the automatic notifications include suggested actions for assistance concerning one or more of the calls. In one specific example, an automatic notification is used to prompt the user via the UI to select specific or additional computing resources as needed to run contact center operations given a specific situation such as the rate of incoming calls.

Figure 2:
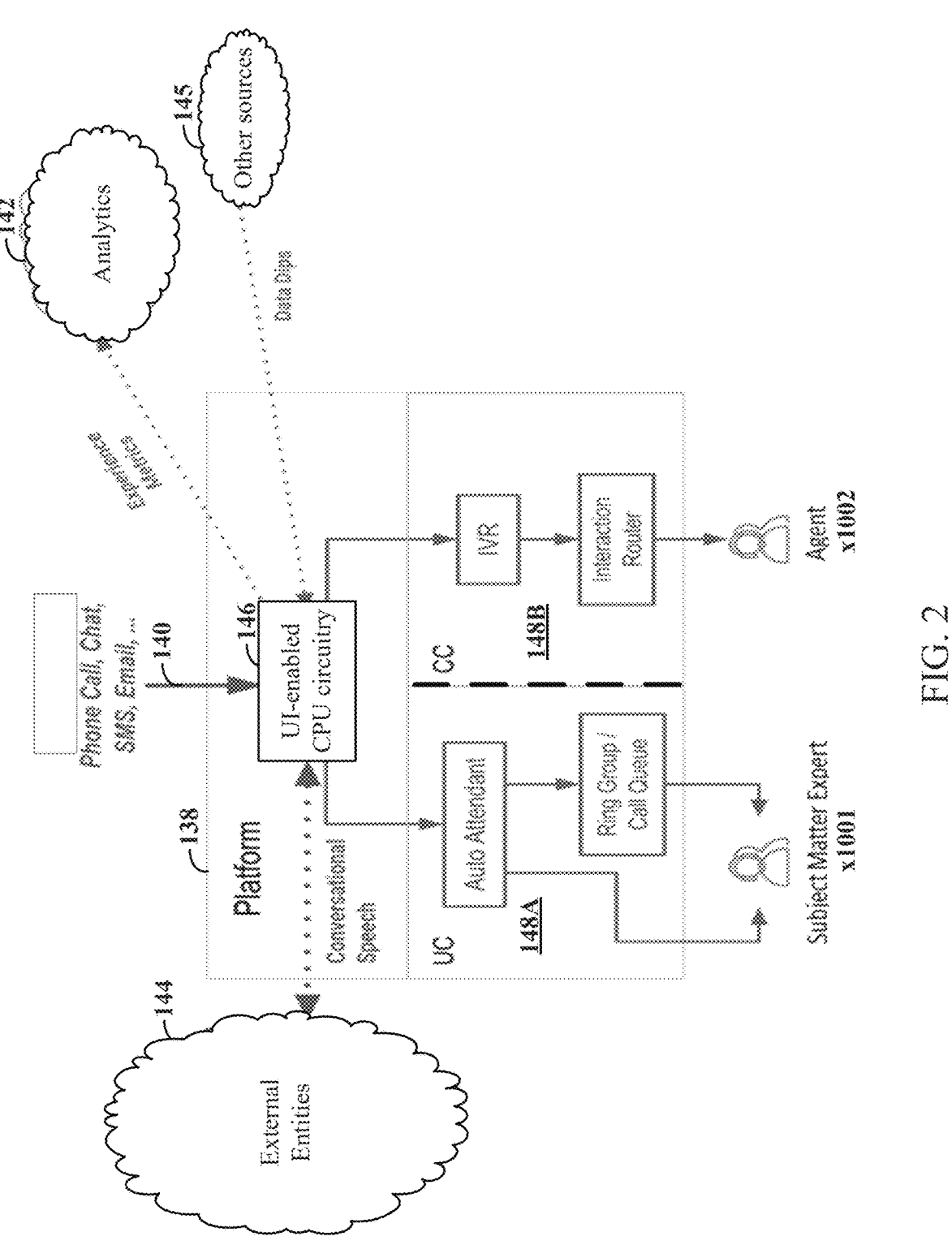
FIG. 2 shows a data-communications system, in accordance with various embodiments.

Another form of an example data-communications system is shown in FIG. 2, which bears similar aspects as the system depicted in FIG. 1 and which also uses a UI with such a set of FoV sections to help the receptionist process incoming calls received by the system's data-communications server (representing one or more servers) 138. The incoming calls may be, for example, in the form of VOIP calls, chat, SMS, email and other types of communications. The data-communications server 138 in this example is configured as a unified-communications and call center (UC-CC) platform, and which may receive different types of communications via one or more different types of channels (e.g., typically over the Internet. The system of FIG. 2 may also be configured for processing incoming interactions associated with the server 138 processing conversational speech (e.g., by monitoring, recording, transcribing and analyzing) and with other data sources via connections to other circuit-communicative endpoints through a broadband network (e.g., Cloud-based) as depicted at network 144.

An analytics (CPU) processor circuit 142 and other database/source circuitries (e.g., accessible through the network 144 and in some examples others) may be integrated with the server 138 but separated by pathways via one or more broadband connections. The analytics processor circuit 142 may be used in a manner corresponding to the analytics circuitry 102 as discussed with FIG. 1. Alternatively, the server 138 may have the analytics circuitry internal to the platform (not shown in FIG. 2) and/or the analytics processor circuit 142 may be used selectively by the server 138 to complement the data and associations of the information sets stored in the analytics circuitry internal to the server 138. In another example, the analytics block 142 in FIG. 2 is a software analytics package that is downloaded (optionally with an AI algorithm) for use and execution via computer processing circuitry (and/or a server) of a client entity.

The other database/source circuitries 145 permit the server 138 to be connected to other sources of information including, as examples, AI/ML resource services which may be trained via data fed by the server 138, customer systems, and third-party servers (e.g., Lexis and Westlaw (online research), Salesforce™, Microsoft Dynamics, and other applications for business, research, etc.).

The server 138, as shown with conceptual (not physical separation of) responsibilities and tasks at 148A and 148B, processes each of these different types of interactions via an integrated memory (e.g., the database circuit 101 of FIG. 1) for access to information sets which may have user/client-entity contact information and/or experience data corresponding to past incoming data-communication interactions processed by the UC-CC platform. The server platform receives and initially processes an incoming interaction via channel 140 so that an initial step of analysis may be performed. This initial analysis step, which again may be performed conceptually on one or both the UC and CC sides, may involve, for example, security authorization, gate-way passing and/or handing off the incoming interaction to another module within the server or outside the server for further analysis such as the analytics processor circuit 142. Importantly for personalization and client-specific customization, the initial analysis step may also involve oversight and control via access to the above-characterized UI.

In one specific example implementation, the server (or "server platform") 138 includes a UI-enabled computer processing circuit 146 which includes a data-communications management circuit and a UI as described in connection with one or more of the above examples. The UI-enabled computer processing circuit 146 is operable on behalf of at least one specific client and is configured to permit callers (on one or more of the channels types at 140) to benefit from an apparent self-service experience which may involve a silent (seemingly transparent) receptionist via the above-discussed FoV sections. Via a customized one of the several FoV sections, the receptionist can enable certain individual calls, groupings of calls, and/or types of calls to be automatically processed (routed to a subject matter expert, a desired agent, or automated recording with requested information) with the customized one of the FoV sections indicating when and which calls have been routed to designated call participants via the automation, and further indicating, via monitoring of the call (e.g., via feedback from the designated call participants at the close of the call and/or one or more of the circuits in processor circuitry 106 of FIG. 1) whether the automatically-processed call provided a successful user experience, for example, from the perspective of the individual who initiated the call.

The vertical dashed line in the server platform 138 is used to show separation of responsibilities of the server conceptualized via UC side 148A and CC side 148B of the server platform; however, in certain example embodiments of the instant disclosure these UC-side and CC-side responsibilities may be actually implemented via physical/logical integration in various ways including the following specific examples performed by the platform/processing circuit to provide an integrated secure-access environment and being performed as only one or a combination of one or more of the following actions, each of which may be overseen and interrupted by the receptionists using a section of the sectionalized UI as in the above examples (including those exemplified in the figures of Appendix 1 and/or Appendix 2). First, a high-level security-based firewall circuit may be implemented (which may be integrated with the above-discussed database manager) for accessing one or more of the circuitries 101 (FIG. 1), 142 and/or 144 with secondary/tertiary level checks before granting accesses. Second, access to one or more of the circuitries 101, 142 and/or 144 may be granted with the access pathway implemented as an internal bussing structure controlled by a database manager internal to the UC-CC platform, so as to control access requests to or from the platform. Third, such accesses may be granted while prohibiting traversal of any broadband gateway circuit and/or of any security-based firewall circuit. Fourth, such accesses may be granted so long as data provided from one or more of the circuitries 101, 142 and/or 144 occurs via a single access-based request-and-receive-data transaction, for example, a "single dip" transaction, involving only one of the circuitries 101, 142 and/or 144. Fifth, there is a limited number of such access-based request-and-receive-data transactions, for example, a "double dip" involving two transactions to any one of the circuitries and/or involving two transactions to two of the circuitries 101, 142 and/or 144 (or alternatively, a "triple dip" involving three transactions collectively to two or to three of the circuitries 101, 142 and/or 144). Sixth, such accesses may be granted while prohibiting (or exclusively permitting certain types of) data from being provided over any or one or more particular broadband networks, any or one or more particular gateways, and/or any or one or more particular security-based firewall circuits. Again, two or more of the above examples may be used in combination, for example, with the sixth example being used with fourth or fifth example.

Next, the incoming interaction may be processed by circuit-based modules which traditionally are more closely associated with only one of the UC and CC sides. For example, as depicted in FIG. 2 at the UC side, activities may involve functionality involving personalized involvement by the receptionist at the UI, wherein the receptionist causes the call to be processed via auto-attendant operations/recordings, and/or ring-group/call-queue operations to permit incoming callers to access experts/specialists (e.g., a subject matter expert) having specialized knowledge concerning the nature, purpose or context of the incoming interaction as discerned by the analytics processing of the incoming interaction and/or as indicated by answers from the initiator (e.g., caller) of the incoming transaction to automated subject-based hierarchical queries from the server back to the initiator. The server/processing circuit may route such a particular incoming interaction to a discerned one of various possible selected experts (or specialists) having a high likelihood of being able to address the issue of the incoming transaction. In more specific example embodiments, the server/processing circuit may decide at which point to route the incoming transaction to such an expert or specialist (via real or virtual system extension x1001) based on a confidence level, relative to a fixed or variable threshold, that the discerned issue is likely corresponding to a knowledge category or categories linked to the expert or specialist. Moreover, the threshold and/or the manner in which the issue is discerned may be based on the server/processing circuit assessing data from, as examples: information set(s) accessed in the database (e.g., 101 of FIG. 1); and analytics circuitries/modules (which may or may not include AI/ML models), whether internal to the data-communications system and/or external via a broadband and gateway to/from the system (e.g., via analytics processor and/or other database/source circuitries 142, 144 of FIG. 2).

At the call center (CC) side where activities are more directly associated with a receptionist's interactions involving the UI's FoVs, examples of specific activities include interactive voice recognition (IVR) operations to permit incoming callers to access information automatically via a voice response system of prerecorded messages without having to speak to the receptionist or an agent, and/or use of menu-driven options to have their calls routed to specific departments or specialists, with or without similar confidence assessment as described above in connection with the server/processing circuit assessing data from the above-noted examples (e.g., via 101 of FIG. 1 and/or 142, 144 of FIG. 2). As depicted at the bottom of FIG. 2, the server/processing circuit may route the incoming transaction to an agent, for example, via real or virtual system-based extension x1002, selected through the system's service-provided IVR experience. Each of these specific activities may be caused, enabled for automation (e.g., via the discerned call context or via the callee or caller ID), and disabled by the receptionist's interactions at the UI. For example, according to one configuration, one FoV section of the UI displays active calls with the FoV section displaying such a related processing status indicating how each active call is being processing in connection with the specific activity. According to another configuration, the FoV sections include one customized section in which the UI displays this related processing status.

Accordingly, with the example embodiment of the system shown in FIG. 1, the related system depicted in FIG. 2 uses the UI to permit a user with a single virtual workspace having as many as every available component from every available application accessible to process, track and facilitate apparent automated self-service experiences for users by resolving inquiries discerned through the incoming interactions and/or effecting call-decision routing of incoming interactions to call-center agents or specialists.

In connection with the above-characterized embodiments including but not limited to those described in connection with FIGS. 1 and 2, analytics-specific processing computer circuitry (e.g., 102, 110 of FIG. 1 or 146 of FIG. 2) provides AI-based analyses to predict whether a certain call condition would occur. As an example, the user of the UI may use the UI to transfer a call to one or more specific agents based on answer rates and/or specific regions of the entity in a given time period. As discussed earlier, one or more sections of the FoV may be configured to customize notifications regarding such rates and/or to link (or block access) to certain agents such as by modifying entries as viewed in the FoV's directory listing section. The call answer rate can be based on general trends over time, such as identified patterns of agents in response to different events and/or situations. The patterns can be specific to an agent, e.g., Agent A takes time off when it snows more than three inches, and/or specific to a region, e.g., a particular region has 20% of agents unable to answer calls after it snows or rains more than three inches. Such patterns can be based on weather, local events (e.g., sporting events, political events, school calendar, such as scheduled days off, fundraisers and other), non-local events (e.g., national sporting events, religious holidays, general time of year) illness or other health related trends. As an example, a first entity may allow their agents to work remotely from home and a second entity may not. The second entity may be more greatly impacted by weather related events (e.g., more agents cannot make it to work and thus cannot answer calls) than the first entity. Such trends may be different for different locations and different demographic groups of agents. For example, agents of a particular age may be more likely to be unable to answer calls after a local sporting events than other agents, although embodiments are not so limited.

In some embodiments, the UI-enabled computer processing circuit 146 may include service circuitry to provide services, including applications that respectively generate data sets corresponding to characteristics of a call center, through client-specific data-communications with endpoint devices. The UI-enabled computer processing circuit 146 may also include UX circuitry that provides a UX interface for one or more of the endpoint devices. Specifically, the UX circuitry configures a workspace to include a graphical user interface (GUI) provided for display at one or more of the endpoint devices, in which the GUI includes panes that define respective areas of the workspace. Users may configure the layout of their workspace in a variety of manners. For instance, the UX circuitry may associate respective ones of the data sets generated by different ones of the plurality of applications with specific ones of the panes. Each respective pane may be associated with one of the data sets that is different than ones of the data sets associated with one or more of the other ones of the panes. For example, users can set up the UX layout to display information obtained from different applications, and the UX may interface with other applications within a common organization/entity or third-party applications, to obtain information to display in each pane. In response to receiving data corresponding to associated ones of the data sets, the UX circuitry displays the data in the pane associated with the data set.

Figure 3:
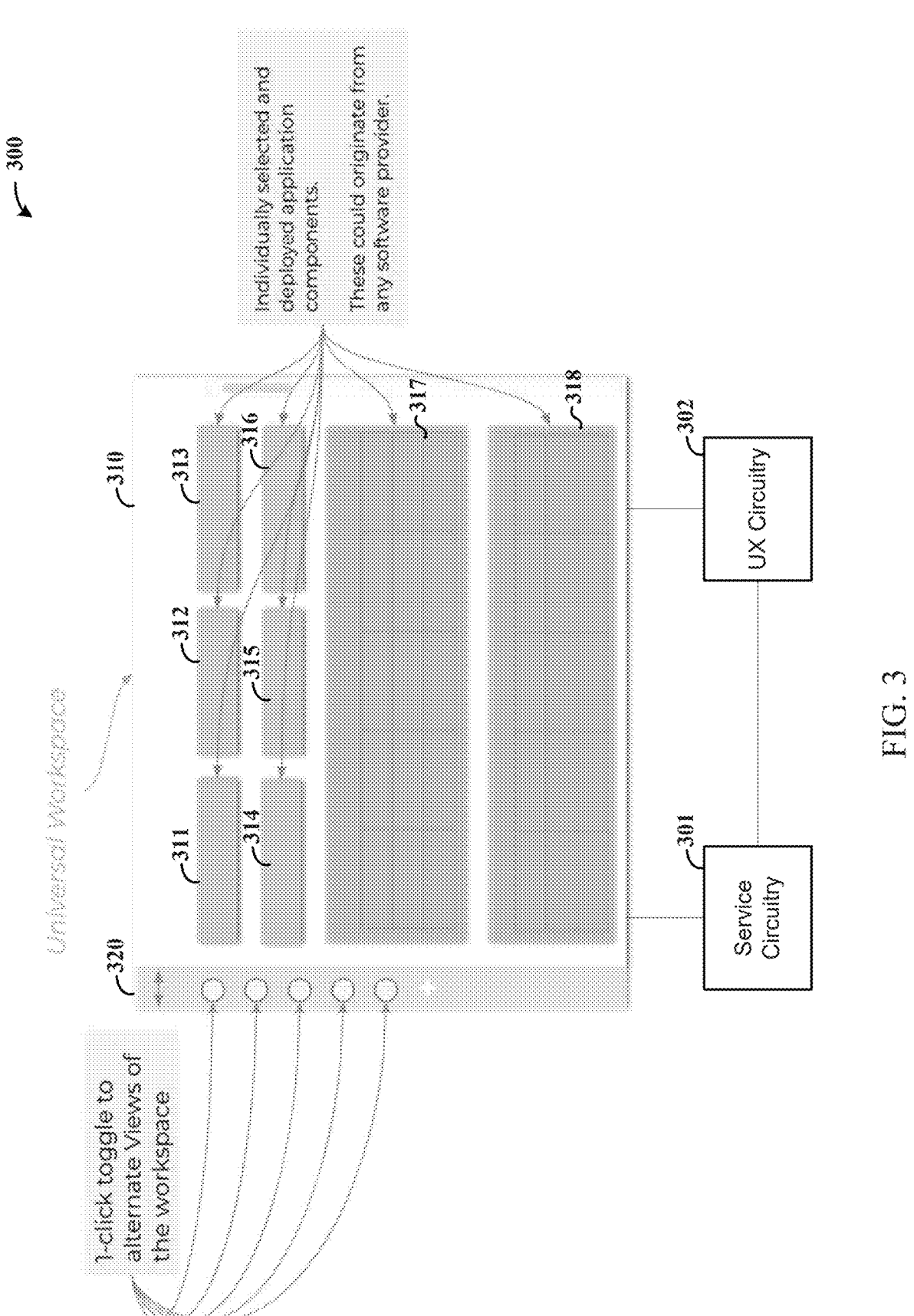
FIG. 3 shows a system with interface circuitry operable for data-communications with configurable panes, as may be implemented in accordance with one or more embodiments.

FIG. 3 shows a system 300 with interface circuitry operable for data-communications with configurable panes, as may be implemented in accordance with one or more embodiments. The system 300 may be implemented in a variety of manners and with various supporting circuitry. For example, the system 300 may include service circuitry 301 and UX circuitry 302, which may operate together in accordance with one or more embodiments herein. As another example, the system 300 may operate with the UI-enabled computer processing circuit 146, which may provide a user interface as shown.

The system 300 operates to provide a universal workspace 310, toggle control 320, and a plurality of panes 311-318 as may be deployed to utilize application-specific data sets obtained via disparate, remotely-operating application circuits. An operator may add or remove an individual component from respective applications available to the operator for creating the data sets. This may allow the operator to maintain a single workspace operating on certain design logic while adding, removing, purchasing, or sampling any other application component they may need to manage their responsibilities. For instance, certain applications provided by service circuitry 301 may be selected for implementation to provide data sets for display on one or more of the panes 311-318. This display may be provided by UX circuitry 302, which may access the data sets from service circuitry 301 and provide data corresponding to the accessed data sets to the universal workspace. Alternatively (or in addition), the UX circuitry 302 may operate to control the universal workspace 310 to access the data sets directly from service circuitry 301. The system may thus facilitate interaction with and/or control of multiple disparate applications for obtaining different types of data as generated from the disparate applications, for common display.

Figure 4:
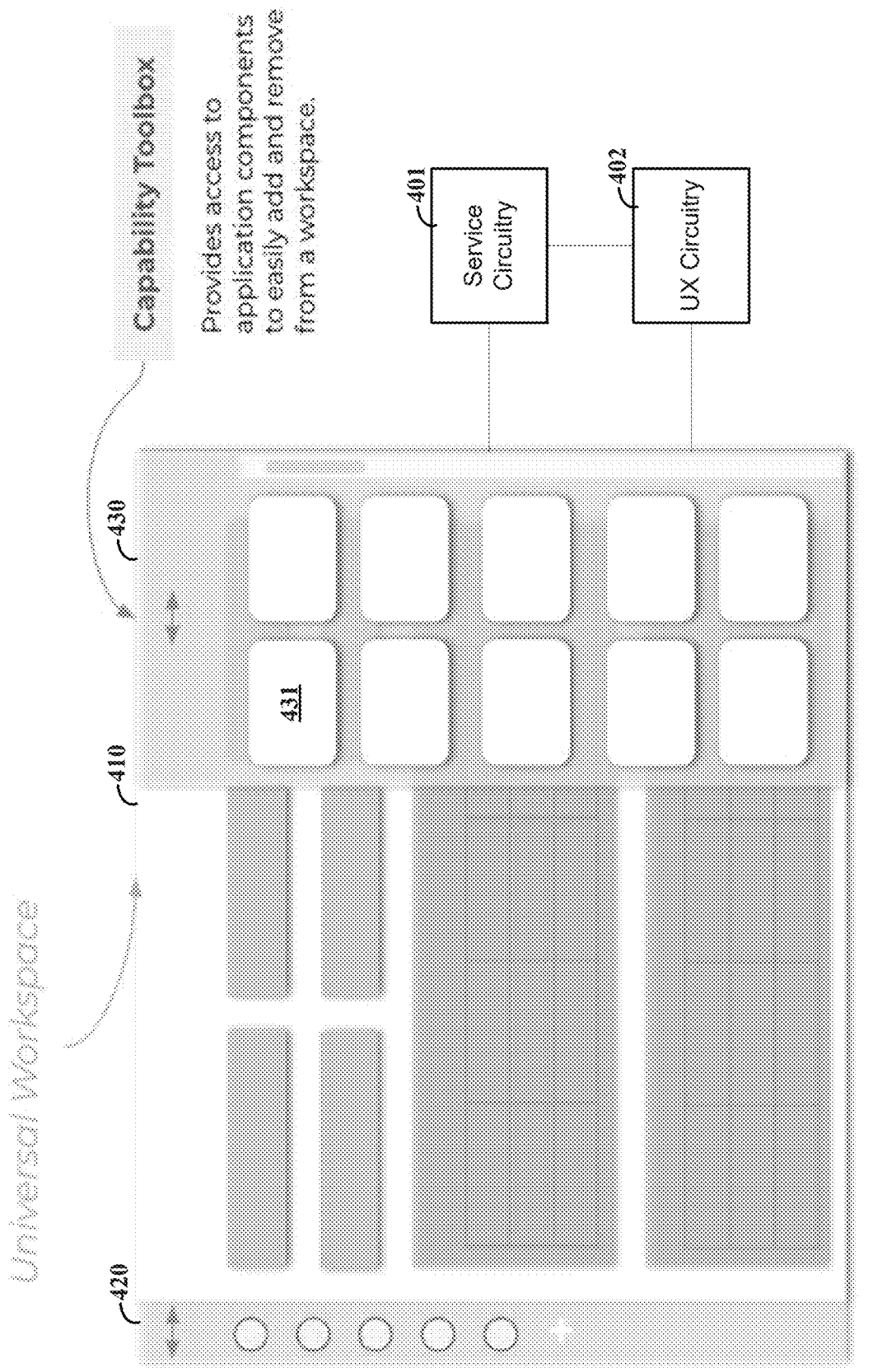
FIG. 4 shows a system with interface circuitry operable for data-communications with an application interface, as may be implemented in accordance with one or more embodiments.

FIG. 4 shows a system 400 with interface circuitry operable for data-communications with an application interface, as may be implemented in accordance with one or more embodiments. The system 400 may be implemented, for example, in a manner similar to (or in connection with) system 300 in FIG. 3, and may implement service circuitry 401 and UX circuitry 402 similarly to that discussed herein with 301 and 302. A universal workspace interface 410 and toggle control 420 may be provided in a manner similar to that characterized in FIG. 3, for controlling a plurality of panes as can be deployed to utilize application-specific data sets.

A capability toolbox 430 may be provided for selecting one or more application components to add to the universal workspace interface 410. For instance, using component 431 as an example, each component shown may relate to one of a plurality of application components provided by one of a plurality of applications operating via service circuitry 401. Using this approach, individual application components may be associated with a specific pane in universal workspace 410. This approach facilitates the display and provision of individual application components, as provided by disparate applications hosted by service circuitry 401, for operation on the common universal workspace as provided by UX circuitry 402.

Figure 5:
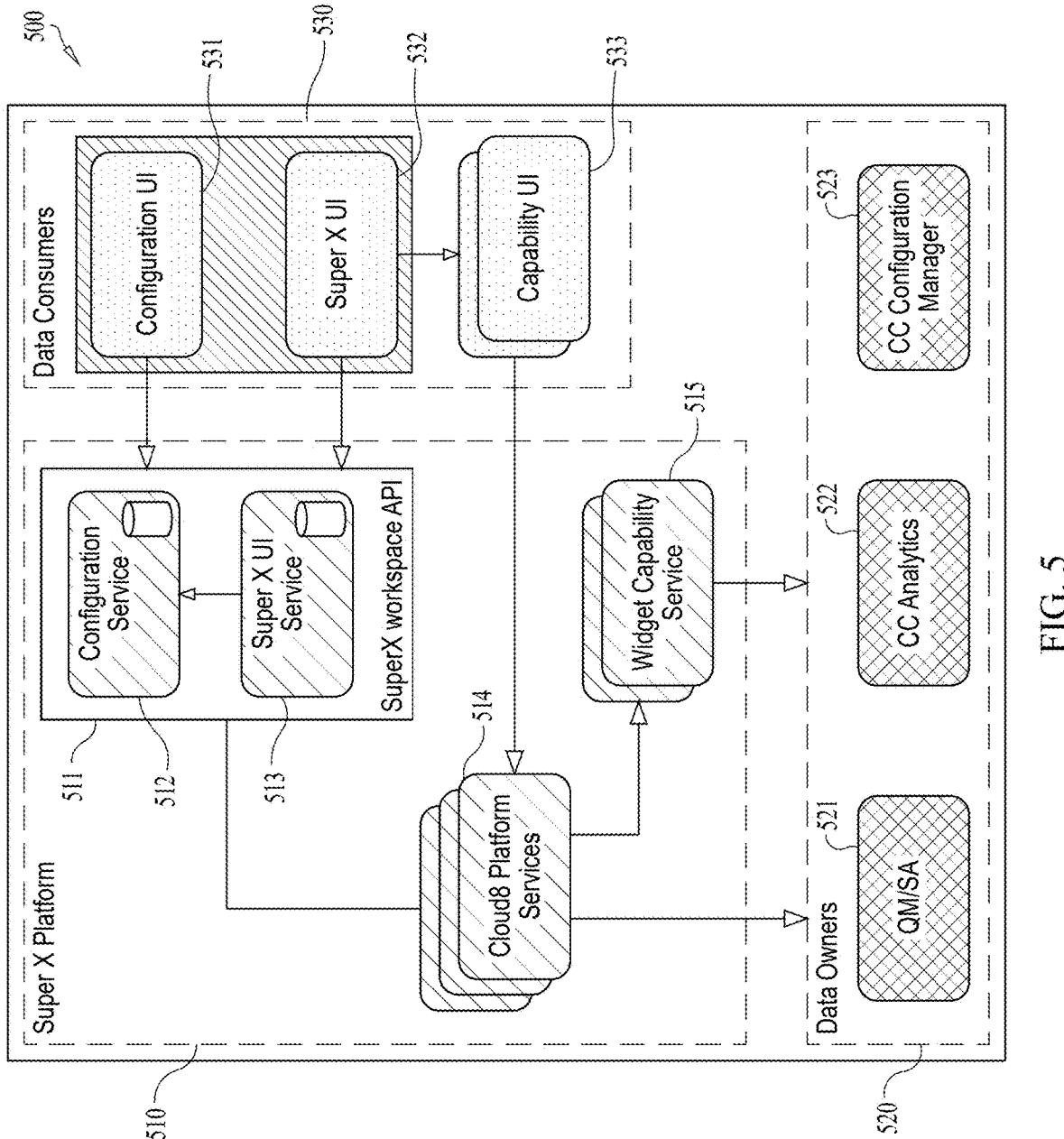
FIG. 5 shows a data-communications system in block diagram form, as may be implemented in accordance with one or more embodiments.

FIG. 5 shows a data-communications system 500 in block diagram form, as may be implemented in accordance with one or more embodiments. The system 500 includes a user interface (UI) platform 510, which interacts with data owners 520 and data consumers 530, all of which may be implemented with one or more circuits configured for inter-operation and provision of a user interface. The data owners 520 are shown by way of example as including quality management/speech analytics (QM/SA) component 521, as well as analytics and configuration manager components 522 and 523 (e.g., as may be implemented for call center functions). The data consumers 530 are shown by way of example as including a configuration UI 531, a Super X UI 532, and one or more capability UIs 533.

The UI platform 510 may include a workspace API (application programming interface) 511 having a configuration service 512 and Super X UI service 513, shown by way of example as interacting with Configuration UI 531 and Super X UI 532. The UI platform 510 also includes one or more platform service blocks 514 that interacts with the capability UI 533 (and may further interact with data owners 520). A capability service block 515 interacts with data owners 520 to provide widget/application components for providing a modular UI, and may further interact with the platform services block 514 as shown.

Figure 6:
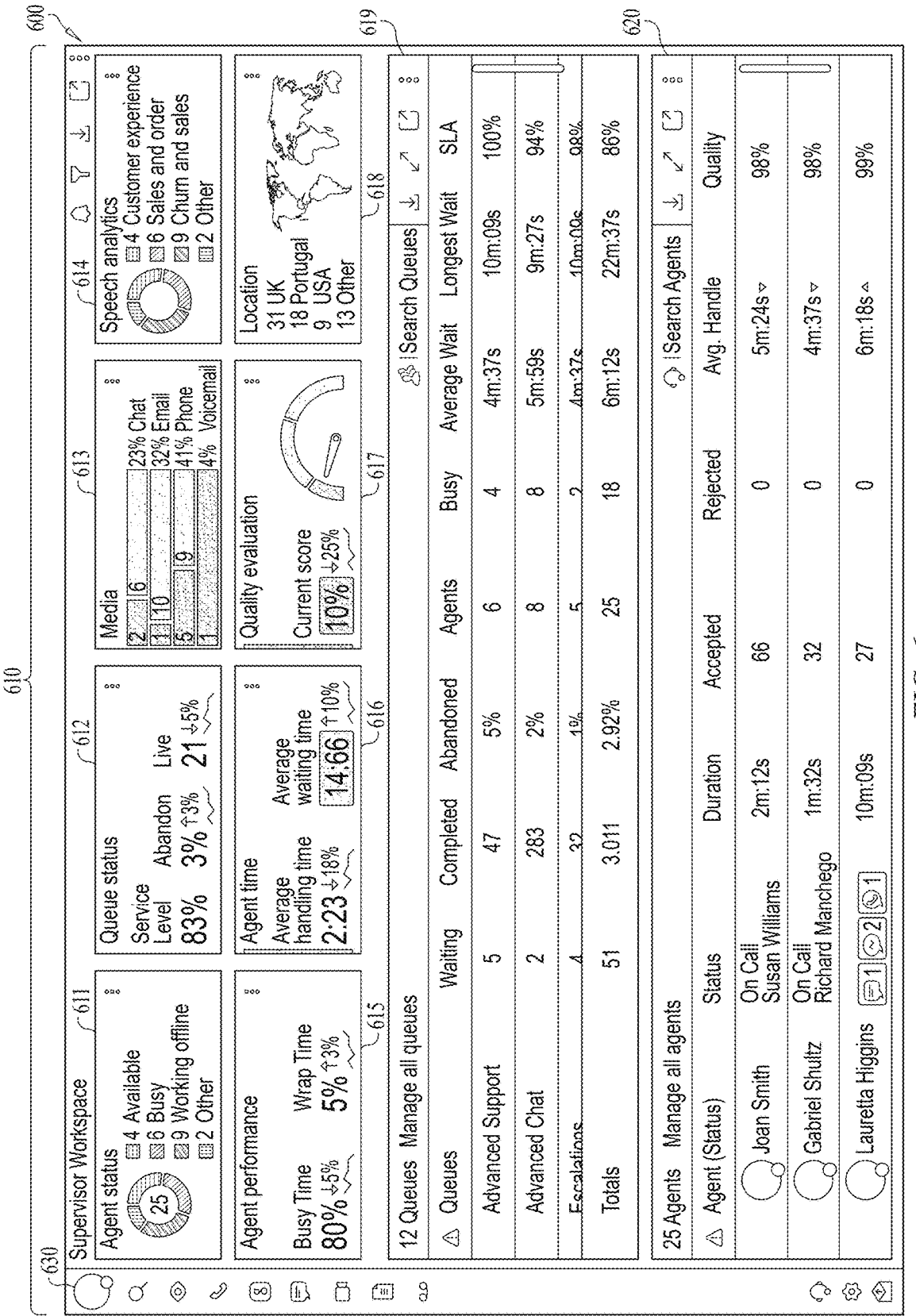
FIG. 6 shows a system with interface circuitry operable for data-communications with configurable panes, as may be implemented in accordance with one or more embodiments.

FIG. 6 shows a system 600 with interface circuitry operable for data-communications with configurable panes, as may be implemented in accordance with one or more embodiments. The system 600 may be implemented in a manner similar to that characterized with system 300 in FIG. 3, for instance as may be operable with and/or include service circuitry 301 and UX circuitry 302. A universal workspace 610 and toggle control 630 are provided, the former displaying panes 611-620 and the latter providing a toggle between respective views (e.g., switching between a chat view displaying an ongoing chat dialogue, and a supervisor window with panes as shown). The panes may be deployed to utilize application-specific data sets obtained via disparate, remotely-operating application circuits, and can be tailored by user of the system 600. The system may thus facilitate interaction with and/or control of multiple disparate applications for obtaining different types of data as generated from the disparate applications, for common display.

The panes 611-620 may be utilized to display a variety of data, with FIG. 6 depicting specific examples. For instance, pane 611 displays agent status, which may be obtained by operating a remote application to interface with a plurality of agent-provided UX interfaces, obtain status information therefrom, and use the information to generate pane 610. Pane 612 depicts queue status, such as may pertain to customer stations waiting in queue. Pane 613 depicts media types being utilized and by percentage, for instance as pertaining to interactions between agent and customer end-points. Pane 614 depicts speech analytics, for instance as may be generated by a remote speech analytics application that assesses speech characteristics to generate information characterizing data interactions (e.g., media, voice, imagery) with customer endpoints. Pane 615 depicts agent performance, for instance as may be gleaned by assessing an agent endpoint UX to show percentages of time during which an agent is interacting with a customer endpoint, time to wrap up customer interaction, and trending time as to whether these amounts are increasing or decreasing. Pane 616 depicts agent time characteristics pertaining to handling time (e.g., addressing issues) and waiting time. Pane 617 shows a quality evaluation, which may be generated by a remote application based on a variety of types of data. Pane 618 depicts location, which may for example show customer endpoint locations being served by agent stations. Pane 619 depicts queues, and pane 620 depicts specifics regarding individual agents. The data generated for each pane may be generated by multiple remotely operating applications, which may be native and/or third party, with the system 600 operating to interact with each application to pull data and generate the panes commonly displayed as shown.

Managed queues and associated metrics and analytics may be configurable by users, toggling on and off certain functionalities, to create a customized representation of status. For example, status with respect to providing customer support can be displayed, as may pertain to one or more of types of support, call queues, help desk tickets, who is waiting, what calls have been completed (or abandoned), how many agents are assigned to specific areas, wait times (as may include individual metrics such as average, longest, and shortest), SLA/availability/uptime. As previously referenced, it is to be recognized that users may completely customize their workspace (or workspaces), which may include any of: configuring the layout of their workspace with the ability to modify that configuration at any time to create new workspaces and/or workspace views; selecting the components and/or data sources that are integrated in their workspace/workspace view including dynamically changing components and/or data sources that are included in a workspace representation; selecting features/functionalities for reporting/analytics including an ability to toggle on/off features for reporting/analytics to further create customized reports in real-time (or near real-time); and configuring control over data insights/suggestions, among other examples. This information may be presented in real-time, or near real-time, with dynamic updates. For instance, in the example shown in system 600, Pane 612, depicting queue status, illustrates real-time (or near real-time) changes to specific aspects (e.g., "abandonment" and "live") that are reflected from application of modeling that generates analytics and metrics relative to usage (e.g., created help desk issues, agent assignment and troubleshooting, and high-level results). Exemplary real-time analytics are applicable to any integrated component, for example, as shown in system 600 where Panes 615-617 also reflect real-time (or near real-time updates). As further illustrated, updates to analytics or metrics may be emphasized in a UI for a user to quickly identify notable changes. As an example, key metrics applicable to a user configuration can be identified and emphasized when there are changes that a user should be made aware of. In other examples, various UI identifications may be allocated automatically to changes in metrics that pass a certain threshold. In the example shown in FIG. 6, key metrics in Pane 616 ("average waiting time") and Pane 617 ("current score" in "Quality Evaluation") are automatically updated and emphasized in different ways for a user. Developers can pre-configure key metrics and/or applicable thresholds, where metrics and/or thresholds may be configured in any manner without departing from the spirit of the present disclosure. In additional examples, updates and/or data insights, suggestions, etc., may also be sent to the user through other channels or modalities, devices, associated with a communications software platform. For instance, a user may associate multiple computing devices (e.g., desktop, mobile phone, tablet, etc.) with an integrated app/service, where updates can be sent to a user's mobile device, email, via chat, etc. in the event that a UI workspace is not being consistently monitored. Accordingly, agents can be managed from a supervisor perspective in real-time and assignments may be dynamically changed.

Further, UX menus may be changed in pane, including components that are included therein (which can ultimately change reporting and analytics). Individual panes can be selected and expanded/popped out for configuration within the pane, then return to a composed experience view. Among other functionalities shown, user interface element shown in Pane 619 (e.g., expansion symbol) is configured to provide a quick action to enable expansion/focus on a specific component or extension of workspace. In one example, a user of the adapted UI can create a separate workspace based on a specific component or combination of components such as the combination shown in Pane 619. For instance, a new workspace can be created around that set of components, or that set of components (e.g., Pane 619) can be incorporated into another template. This enables users to create a plurality of workspaces if desired and/or keep focus on specific components that they may wish to include in a main workspace representation. All in all, this functionality is yet another way the UX is extensible to create customized and/or focused workspaces that are adapted for an individual user or users. Workflow can be changed for a given day or set period of time (week, month, year, etc.). For instance, modes can be changed, end of day settings can be made (when an agent finishes work), or an emergency stop can be implemented to cut off a communication.

Panes as depicted in various figures and/or as described herein may be added or configured by searching for available sources, whether native or adding third-party components. Results can be added by drag and dropping desired components into place. This can also impact data analytics and reporting to provide more comprehensive and customized data. For example, a user may wish to select one or more components to generate metrics/graphing/reporting for, where reports can be easily generated for selected components through UX functionality. Additionally, users may wish to dive deeper and select specific features/attributes from components for reporting metrics (this may also apply to selecting features/attributes across different components to create fully customized reporting). Data insights, suggestions, and other details can also be generated and provided to users through UX, to mobile devices, or other endpoints. For instance, machine learning/artificial intelligence (ML/AI) can be applied to correlate data and generate customized data insights that are specific to an entity/or contemplate third-party integrations.

Figure 7:
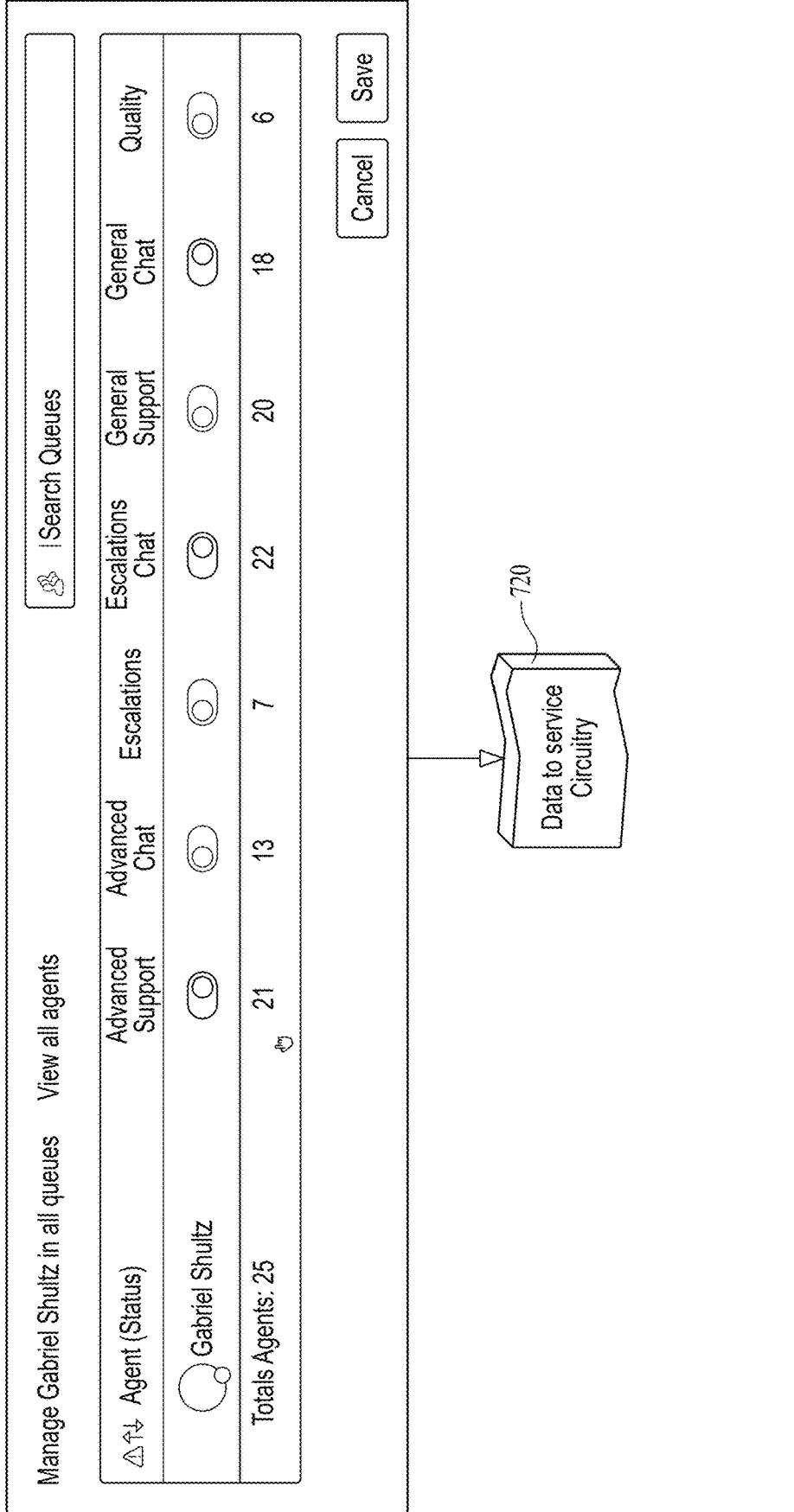
FIG. 7 shows an interface component operable for agent management, as may be implemented with one or more embodiments.

FIG. 7 shows an interface component 700 operable for agent management, as may be implemented with one or more embodiments. Such a component may be displayed, for example, based on selection of a toggle option at 630 in FIG. 6. Selections can be made as shown for setting specific functions for an agent endpoint, by way of example including advanced support, advanced chat, escalations, escalations chat, general support, general chat, and quality. This functionality provides supervisory users with the ability to manage other users (individually or in groups) through quick one-click actions. In the example shown in FIG. 7, assignments of a specific agent (e.g., "Gabriel Shultz") can be modified in real-time. For instance, if the agent needs to be reallocated to address a specific sector (e.g., "General Chat") due to an influx of queries, a supervisory user can quickly and efficiently remove that agent from receiving queries in other queues (e.g., "advanced support"). Or possibly, that agent has expertise in a sector where other agents are not as advanced (and the response quality is decreasing), where a supervisory user can decide to reallocate that agent to raise the response quality. These selections are then communicated via data 720 that may be provided to system circuitry that facilitates interactions with agent endpoints. Updates can be provided in real-time (or near real-time) to other users, where changes made by the supervisory user can be propagated to the agent ("Gabriel Shultz") as soon as the supervisory user changes an allocation. For instance, exemplary UX functionality may be integrated into a communications software platform and synchronized with other integrated applications/services that may be utilized to control operations of other users (e.g., agents such as "Gabriel Shultz"). This enables efficient control over agent management, where changes can be implemented in real-time (or near real-time). In alternative examples, an adapted UI of the present disclosure further comprises administrative functionality configured to enable supervisory users to transfer supervisory responsibilities to other supervisory users. In one example, a supervisory user may transfer responsibility of one or more agents to another supervisory users, where an exemplary UI is configured to accomplish this by providing UI elements similar to the toggle functionality shown in interface component 700. In other examples, an exemplary UI further provides RBAC configurations for supervisory control of users.

Figure 8:
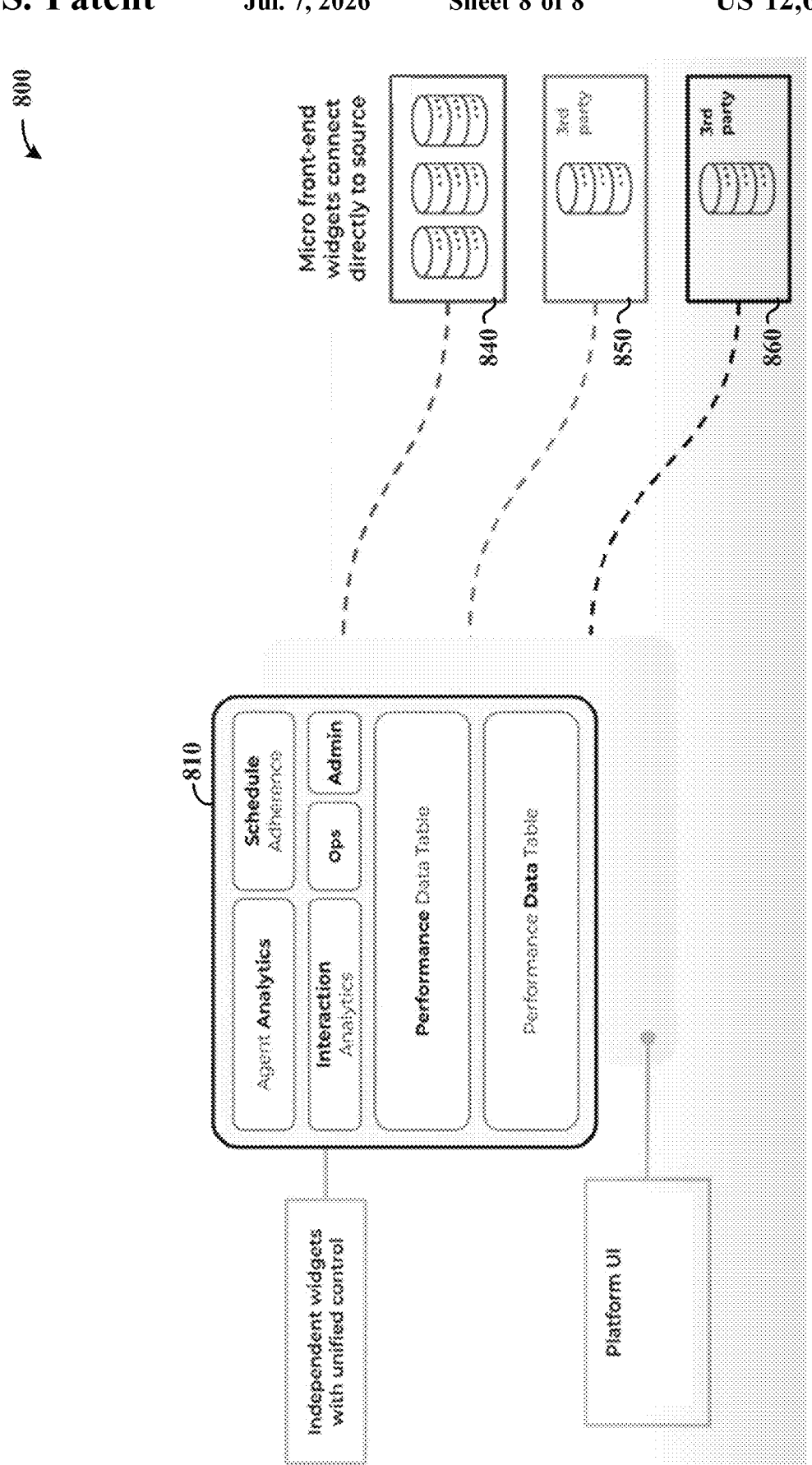
FIG. 8 shows a system for providing a user interface and related data-communications, as may be implemented in accordance with one or more embodiments.

FIG. 8 shows system 800 for providing a user interface and related data-communications, as may be implemented in accordance with one or more embodiments. The system includes a UX circuit 810 for generating and providing a UX display with multiple panes, for instance as described in connection with FIG. 6. The panes may utilize data generated remotely by one or more applications and combined for the respective panes. Independent widgets, or application functions, can be provided and utilized to provide a platform user interface with governance, access control and filter selection. The widgets may be connected to APIs that can be built into a software platform or third-party partners or widget templates. Widgets may be connected and configured to interface/communicate with each other, and may be connected to a source (e.g., service circuitry) without the need for data orchestration. The UX circuit 810 may interact with remote application circuitry, for instance as may include native circuitry 840 (e.g., provided by a common host of the UX circuit 810), and respective third-party application circuits as depicted at 850 and 860. Each of these remote application circuits may provide a variety of functions, which may be accessed and used to provide a UX display. In some instances, the UX circuit 810 operates to send instructions for execution at the remote application circuits, to generate data utilized in the UX display.

As examples, the Specification describes and/or illustrates aspects useful for implementing the claimed disclosure by way of various circuits or circuitry which may be illustrated as or using terms such as blocks, modules, device, system, unit, controller, etc. and/or other circuit-type depictions (e.g., various reference numerals in FIGS. 1 and 2 depict blocks/modules as described herein). Such circuits or circuitry are used together with other elements to exemplify how certain embodiments may be carried out in the form or structures, steps, functions, operations, activities, etc. As examples, wherein such circuits or circuitry may correspond to logic circuitry (which may refer to or include a code-programmed/configured CPU), in one example the logic circuitry may carry out a process or method (sometimes "algorithm") by performing a first-named first activity and also a second-named activity.

For example, in certain of the above-discussed embodiments, one or more modules are discrete logic circuits or programmable logic circuits configured and arranged for implementing these operations/activities, as may be carried out in the approaches shown in FIGS. 1 and 2. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as described in connection with the AI models may be used by the programmable computer processing circuitry to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit).

In various examples implemented in connection with the systems of FIGS. 1 and/or 2 and as exemplified by the illustrations and related disclosure of Appendix 1 and/or Appendix 2, aspects of the present disclosure provide a UI experience having a universal workspace that enables the business leader to add or remove any individual component from any application they have purchased. In more specific examples, this allows the business leader to maintain a single workspace following a single design logic while adding, removing, purchasing, or sampling any other application component they may need to manage their responsibilities.

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. Such modifications do not depart from the true spirit and scope of various aspects of the disclosure, including aspects set forth in the claims.

What is claimed is:

1. A system for controlling a call center using a plurality of applications that respectively generate data sets corresponding to characteristics of the call center, the system comprising:

service circuitry, including a network-enabled communications circuit, configured to provide services including the plurality of applications that respectively generate data sets, through client-specific data communications with a plurality of endpoint devices;

user experience (UX) circuitry, configured to provide a UX interface for at least one of the plurality of endpoint devices, including:

configuring a workspace including a graphical user interface (GUI) provided for display at the at least one of the plurality of endpoint devices, the GUI including a plurality of panes that define respective areas of the workspace;

communicating instructions to at least one of the plurality of applications of the service circuitry to execute operations for generating a respective data set and associating respective ones of the data sets generated by different ones of the plurality of applications with specific ones of the panes, each respective pane being associated with one of the data sets that is different than ones of the data sets associated with other ones of the plurality of panes;

in response to receiving data corresponding to the respective data set, displaying the data in the pane associated with the data set; and wherein the UX circuitry is configured to provide contact center functions to the at least one of the plurality of endpoint devices, including providing data communications routing options for routing external data communications to respective ones of the plurality of endpoint devices with the contact center functions based on the data sets characterizing at least technology capabilities of the plurality of endpoint devices with the contact center functions and one or more user input selections.

2. The system of claim 1, wherein the UX circuitry is configured to remotely communicate with the endpoint devices over a network, and to display the UX interface by providing the UX interface to each of the endpoint devices over the network and causing each endpoint device to display the UX interface.

3. The system of claim 1, wherein the UX circuitry is configured with the service circuitry to communicate instructions that control at least one of the plurality of applications to execute operations for generating the respective ones of the data sets.

4. The system of claim 1, wherein the UX circuitry is configured with the service circuitry to communicate instructions that control the plurality of the applications to execute operations for generating the respective ones of the data sets from each of the plurality of applications, and to display the generated data sets respectively in one of the panes associated with the data set.

5. The system of claim 1, wherein:

the service circuitry is configured to store ones of the data sets generated by the plurality of applications in a data storage circuit; and the UX circuitry is configured to display the data in the pane associated with the data set by accessing the data storage circuit, retrieving the stored data set corresponding to the associated data set, and displaying the retrieved stored data set.

6. The system of claim 1, wherein the UX circuitry is configured to display the data in the pane associated with the data set by accessing a combination of the data sets and displaying, in the pane, data corresponding to different ones of the data sets.

7. The system of claim 1, wherein the UX circuitry and the service circuitry are configured to communicate with one another for providing the UX interface to a plurality of endpoint devices corresponding to a common entity, the UX interface for at least two of the endpoint devices having a different configuration in which data sets displayed in panes at each endpoint device draw from data sets corresponding to a common set of the applications.

8. The system of claim 1, wherein the UX circuitry is further configured to provide contact center functions to the at least one of the plurality of endpoint devices, including associating and displaying the respective ones of the data sets by associating data sets that characterize operational characteristics of the plurality of endpoint devices with the contact center functions; and including providing data communications routing options for routing the external data communications to the respective ones of the plurality of endpoint devices with the contact center functions is in response to the user input selections, the user input selections are provided in response to displaying the data sets characterizing the plurality of endpoint devices with the contact center functions, and the external data communications are received from a source that is external to both the UX circuitry and the service circuitry.

9. The system of claim 1, wherein the UX circuitry is configured to:

provide a control option in at least one of the panes, the control option corresponding to operational instructions to be sent for execution by at least one of the plurality of applications; and in response to receiving a user input corresponding to the control option, generating and sending an operational instruction to the at least one of the plurality of applications thereby causing the at least one of the plurality of applications to generate a new data set, and displaying data corresponding to the new data set in one of the panes.

10. A system comprising:

service circuitry, including a network-enabled communications circuit, to provide services, including a plurality of applications that respectively generate data sets in accordance with operational characteristics of each application, through client-specific data communications with a plurality of endpoint devices;

user experience (UX) circuitry, configured to provide a UX interface for at least one of the plurality of endpoint devices, by configuring a UX interface including a plurality of panes corresponding to different regions of a display at the at least one endpoint device;

displaying respective data in each pane using data sets generated by different ones of the plurality of applications, wherein instructions are communicated to at least one of the plurality of applications of the service circuitry to execute operations for generating a respective data set and each respective pane is associated with one of the data sets that is different than ones of the data sets associated with another one of the plurality of panes; and wherein the UX circuitry is configured to provide contact center functions to the at least one of the plurality of endpoint devices, including providing data communications routing options for routing external data communications to respective ones of the plurality of endpoint devices with the contact center functions based on the data sets characterizing at least technology capabilities of the plurality of endpoint devices with the contact center functions and one or more user input selections.

11. The system of claim 10, wherein the UX circuitry is configured with the service circuitry to communicate instructions that control at least one of the plurality of applications to execute operations for generating the respective ones of the data sets.

12. The system of claim 10, wherein the UX circuitry is configured to:

provide the UX interface to the plurality of endpoint devices by sending data that, when received at the endpoint device, causes the endpoint device to display the UX interface to include user-selectable display options;

to send user data to the UX interface indicative of ones of the user-selectable display options selected by a user; and to display the respective data in each pane by using data sets generated by different ones of the plurality of applications that correspond to the user-selectable display options indicated in the user data.

13. The system of claim 10, wherein the UX circuitry is configured with the service circuitry to display the data in the pane associated with the data set by accessing stored ones of the data sets previously generated by the plurality of applications and stored in a data storage circuit, and displaying data corresponding to the stored ones of the data sets.

14. The system of claim 10, wherein the UX circuitry is configured to provide a plurality of predefined GUI displays for one of the endpoints, each predefined GUI display having a different arrangement of panes and displaying data corresponding to different ones of the data sets, and to toggle between displaying the GUI displays on the one of the endpoints in response to a user input received via the UX interface provided at the one of the endpoints.

15. The system of claim 10, wherein the UX circuitry is configured with the service circuitry to cause different ones of the plurality of applications to execute operations to respectively generate different new ones of the data sets based on user input received at one of the endpoints specifying characteristics of the data sets to be displayed thereon, and to display data corresponding to the generated new ones of the data sets at the one of the endpoint devices.

16. A computer-implemented method for aiding in supervision of a call center using a plurality of components that generate respective data sets indicative of call center status, the method comprising:

providing services including operating a plurality of applications via a server circuit to respectively generate data sets in accordance with operational characteristics of each application, and providing client-specific data-communications with a plurality of endpoint devices corresponding to the generated data sets;

configuring a user experience (UX) display at one of the plurality of endpoint devices, the UX display including a plurality of panes corresponding to different regions of a display at the one of the plurality of endpoint devices; and displaying, at the at least one of the plurality of endpoint devices, respective data in each pane using data sets generated by different ones of the plurality of applications, wherein instructions are communicated to at least one of the plurality of applications of the server circuitry to execute operations for generating a respective data set and each respective pane is associated with one of the data sets that is different than ones of the data sets associated with another one of the plurality of panes, wherein UX circuitry is configured to provide contact center functions to the at least one of the plurality of endpoint devices, including providing data communications routing options for routing external data communications to respective ones of the plurality of endpoint devices with the contact center functions based on the data sets characterizing at least technology capabilities of the plurality of endpoint devices with the contact center functions and one or more user input selections.

17. The method of claim 16, including communicating instructions, based on inputs received at one of the plurality of endpoint devices, that control at least one of the plurality of applications to execute operations for generating the respective ones of the data sets for the one of the plurality of endpoint devices.

18. The method of claim 16, wherein a UX interface is provided to the plurality of endpoint devices by sending data that, when received at the endpoint device, causes the endpoint device to display the UX interface to include user-selectable display options, further including:

sending user data to the UX interface indicative of ones of the user-selectable display options selected by a user; and displaying the respective data in each pane by using data sets generated by different ones of the plurality of applications that correspond to the user-selectable display options indicated in the user data.

19. The method of claim 16, further including displaying predefined GUI displays for one of the plurality of endpoints, each predefined GUI display having a different arrangement of panes and displaying data corresponding to different ones of the data sets, by toggling between displaying the GUI displays on the one of the endpoints in response to a user input received via the UX interface provided at the one of the endpoints.

20. The method of claim 16, including causing different ones of the plurality of applications to execute operations to respectively generate different new ones of the data sets based on user input specifying characteristics of the data sets to be displayed thereat, and to display data corresponding to the generated new ones of the data sets at the one of the endpoint devices.

* * * * *